Nov. 1, 1955 H. T. GUNDERSON 2,722,322
VEHICLE STORAGE AND HANDLING DEVICES
Filed Jan. 10, 1950 13 Sheets-Sheet 1
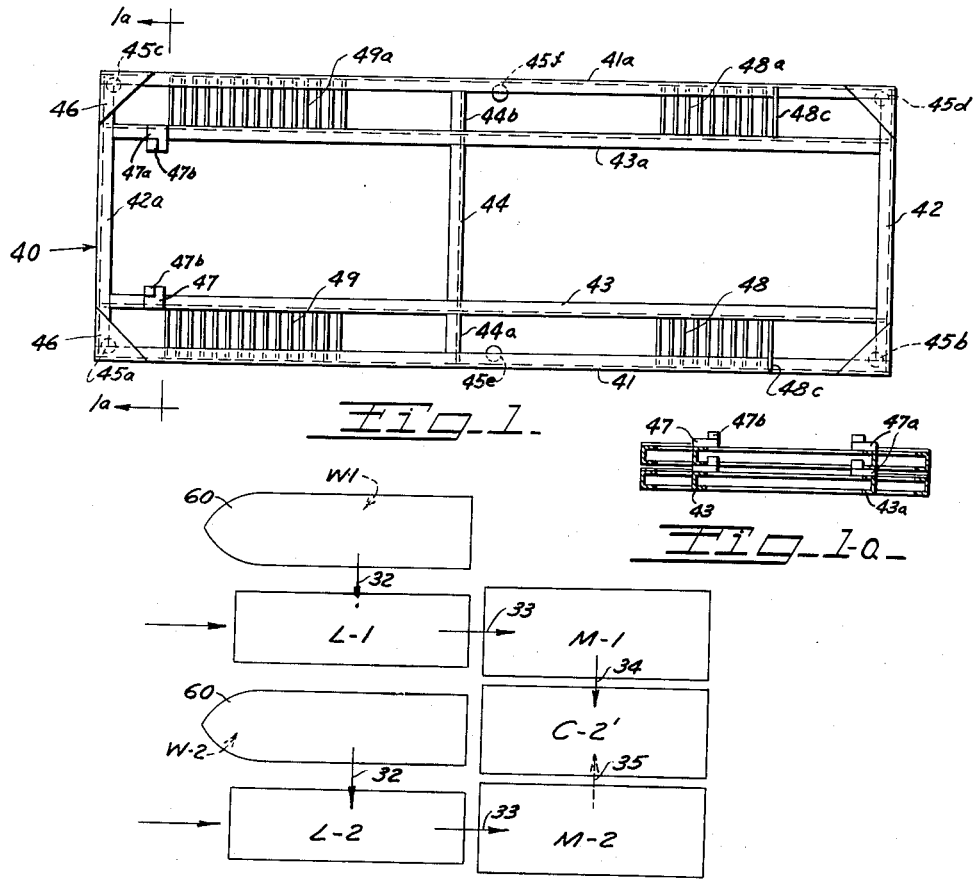
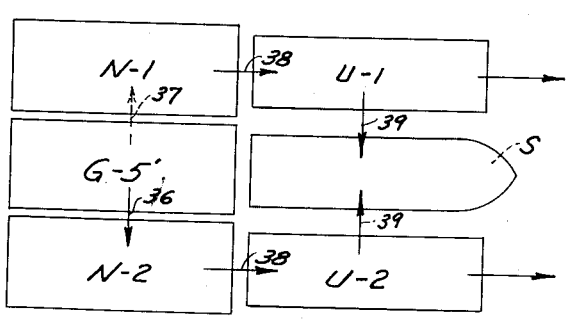
INVENTOR.
HENRY T. GUNDERSON
BY Oswald H. Milmoe
His Attorney Nov. 1, 1955     H. T. GUNDERSON     2,722,322
VEHICLE STORAGE AND HANDLING DEVICES
Filed Jan. 10, 1950     13 Sheets-Sheet 2
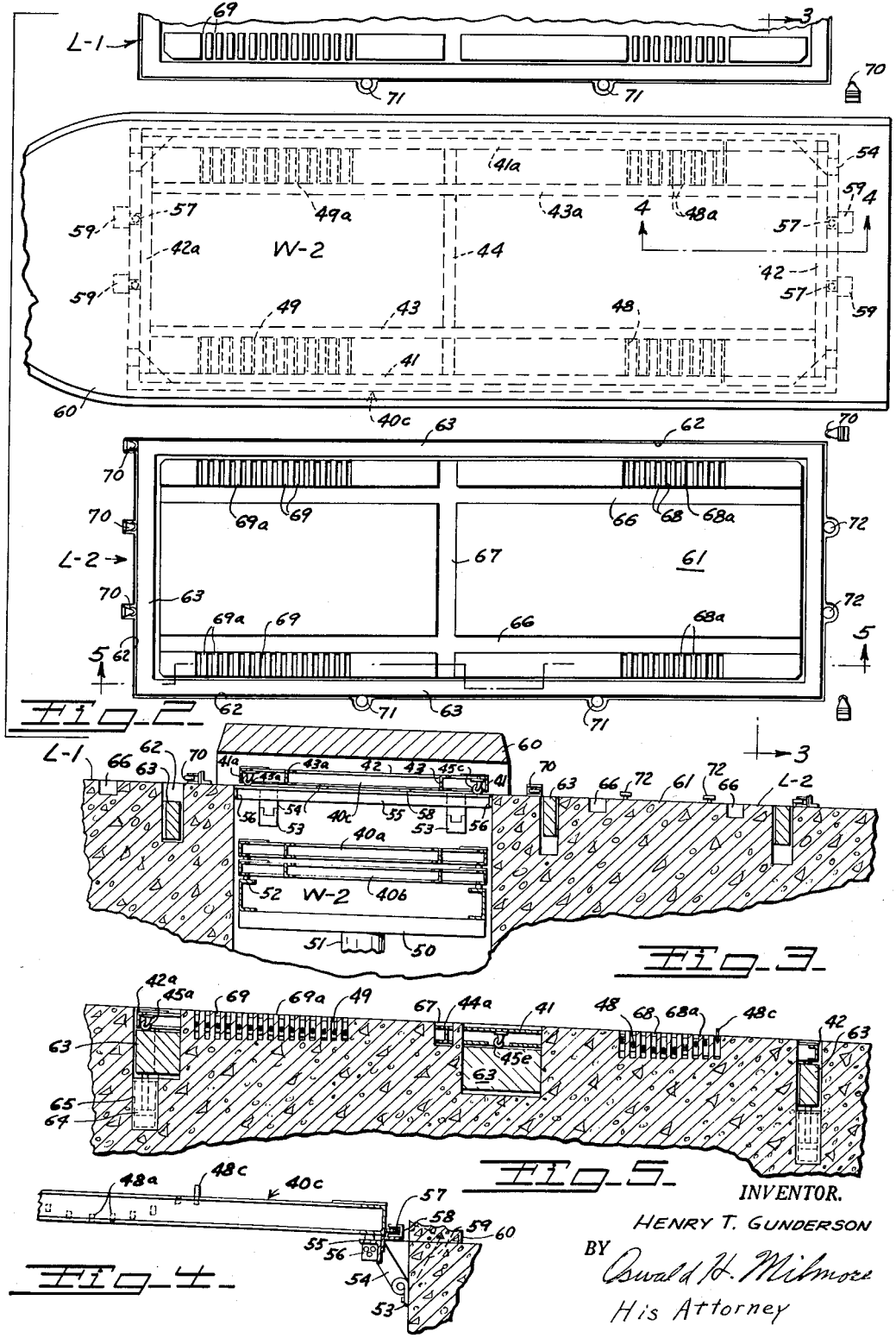
INVENTOR.
HENRY T. GUNDERSON
BY 
His Attorney

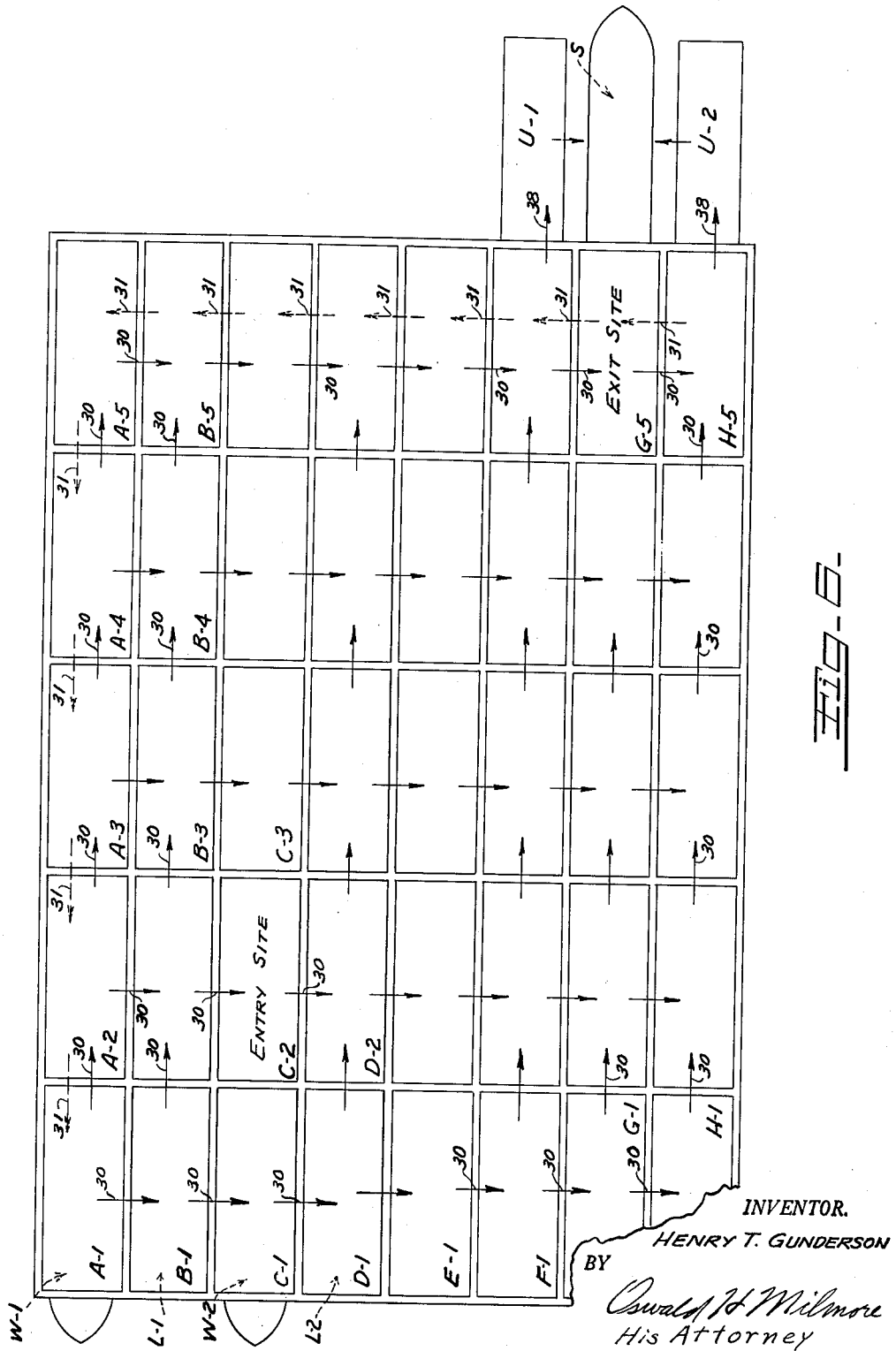

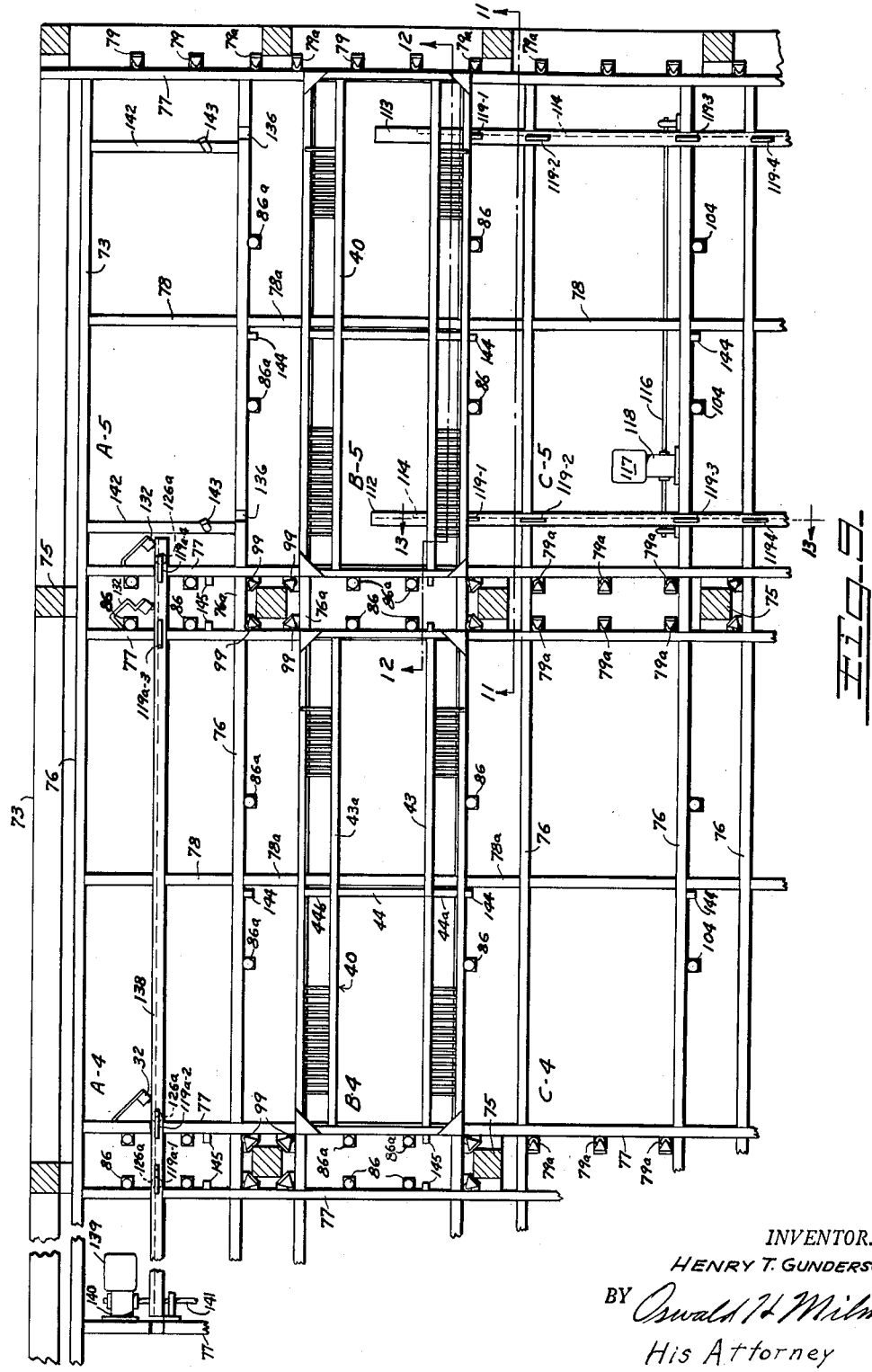

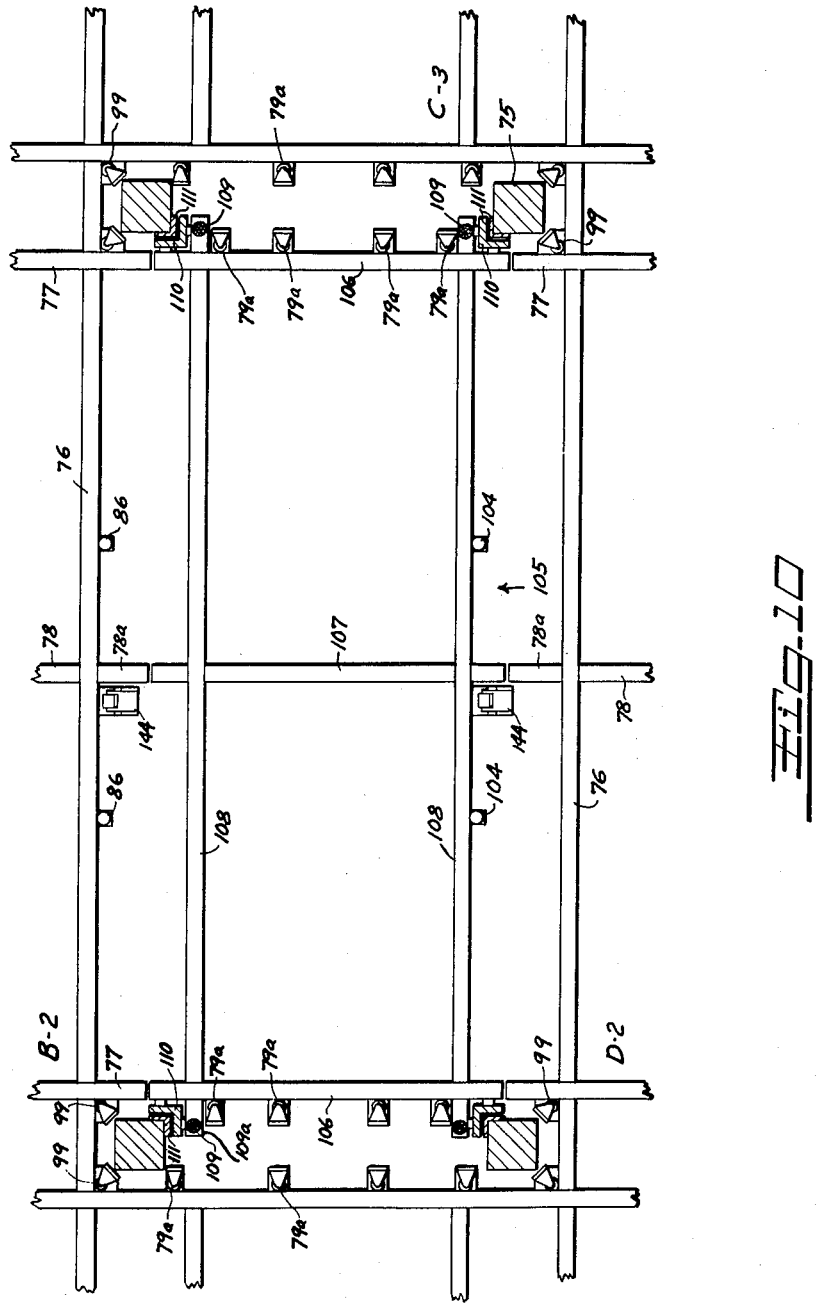

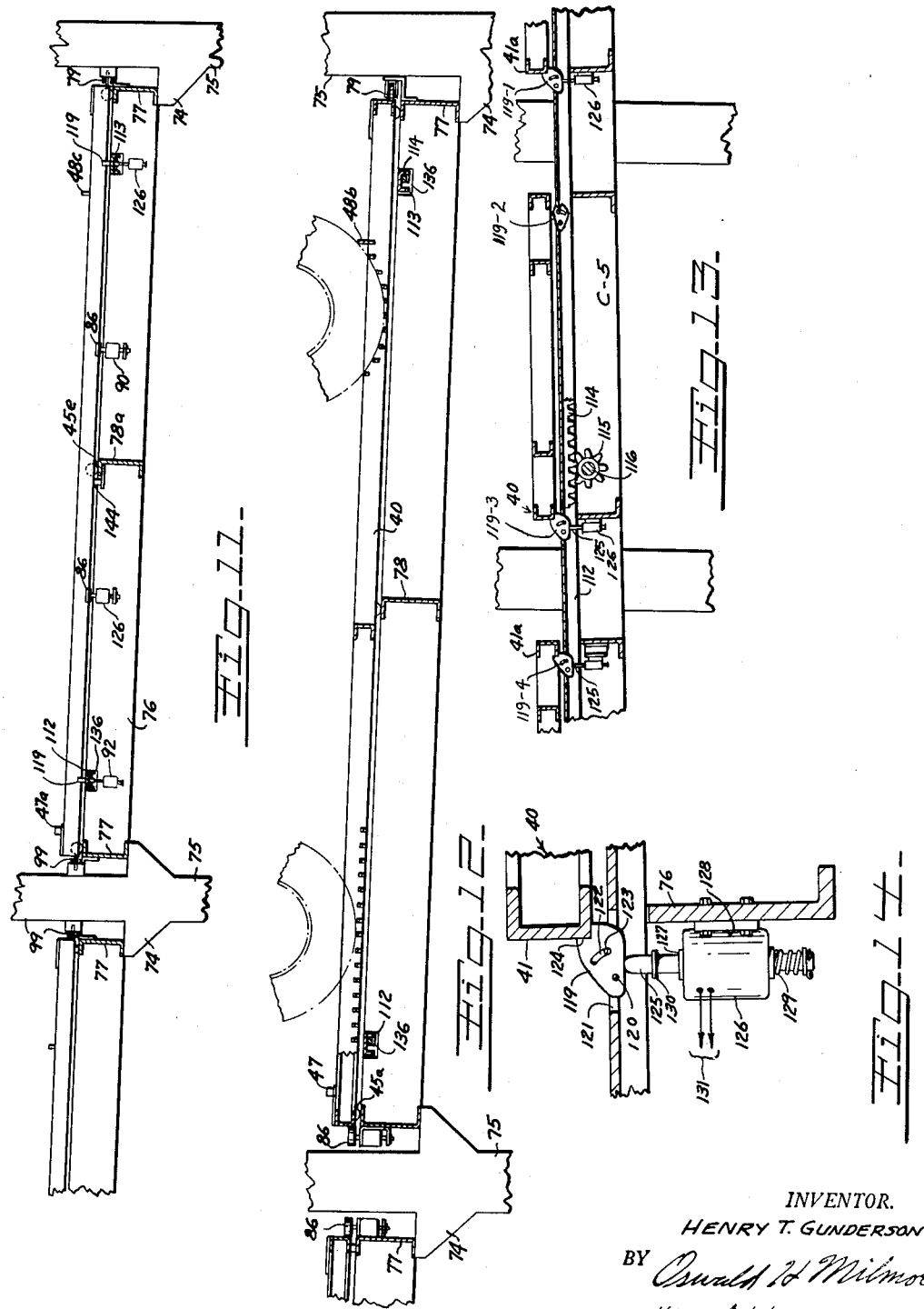

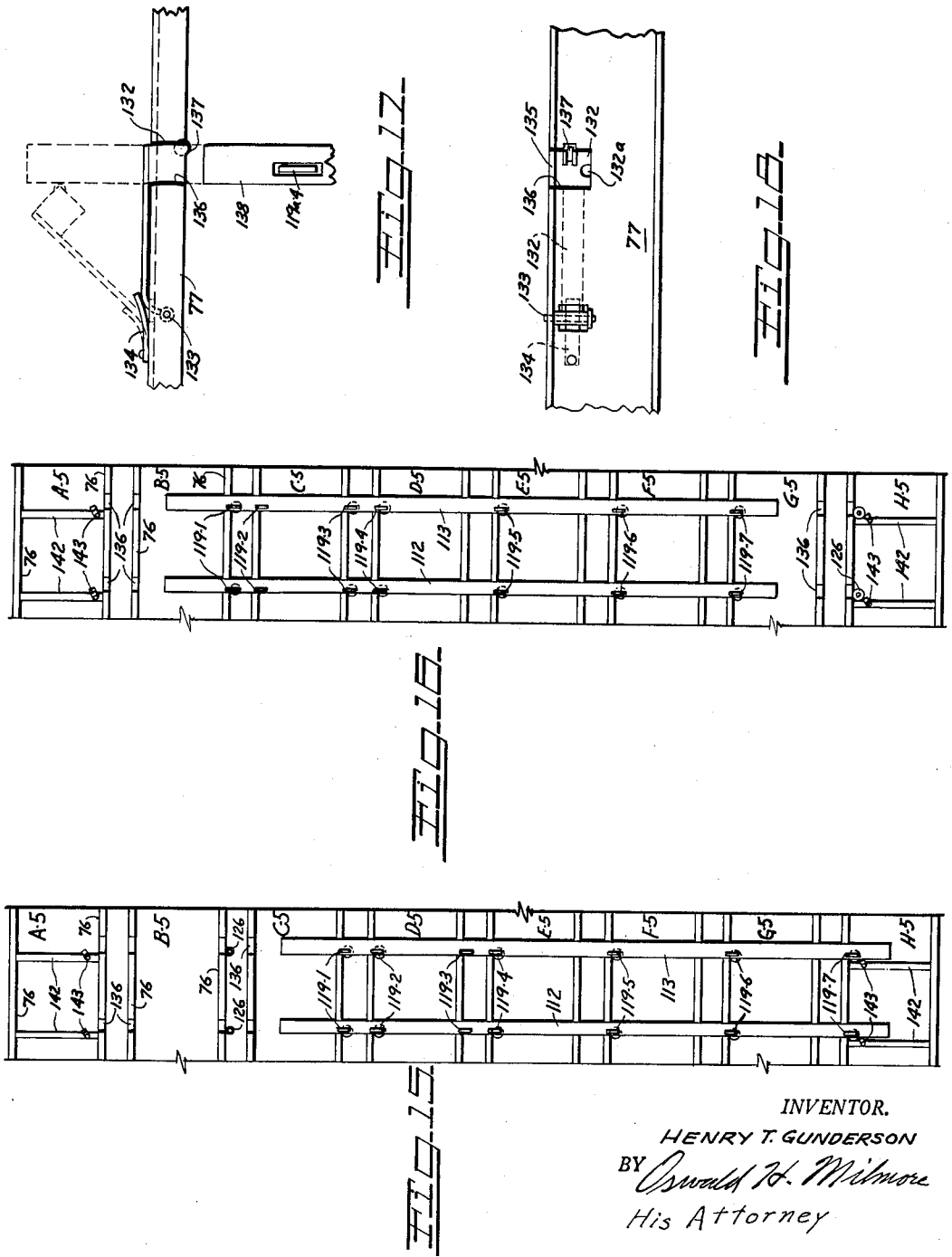

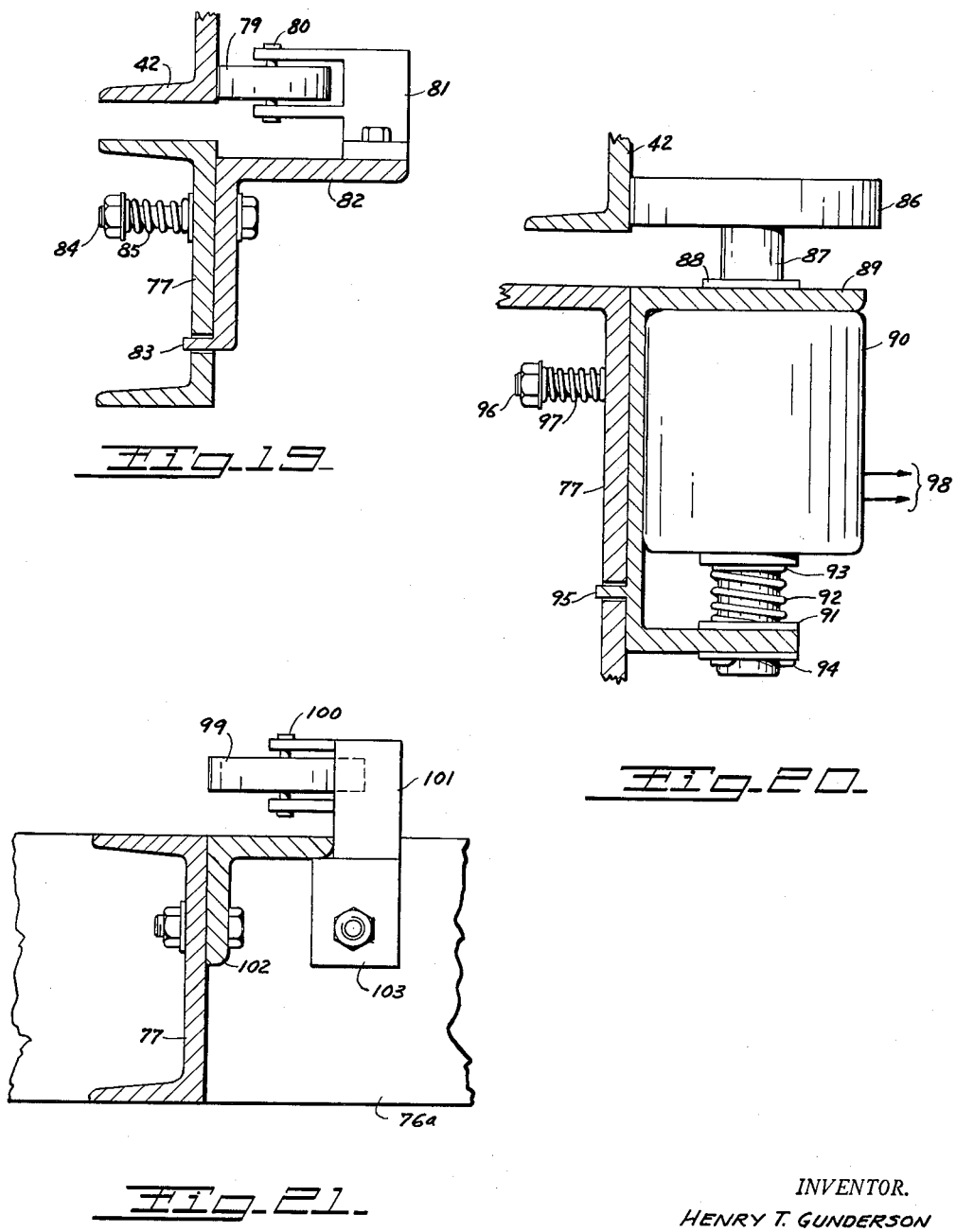

Nov. 1, 1955

H. T. GUNDERSON 2,722,322

VEHICLE STORAGE AND HANDLING DEVICES

Filed Jan. 10, 1950

INVENTOR.
HENRY T. GUNDERSON
BY Oswald H. Wilmore
His Attorney

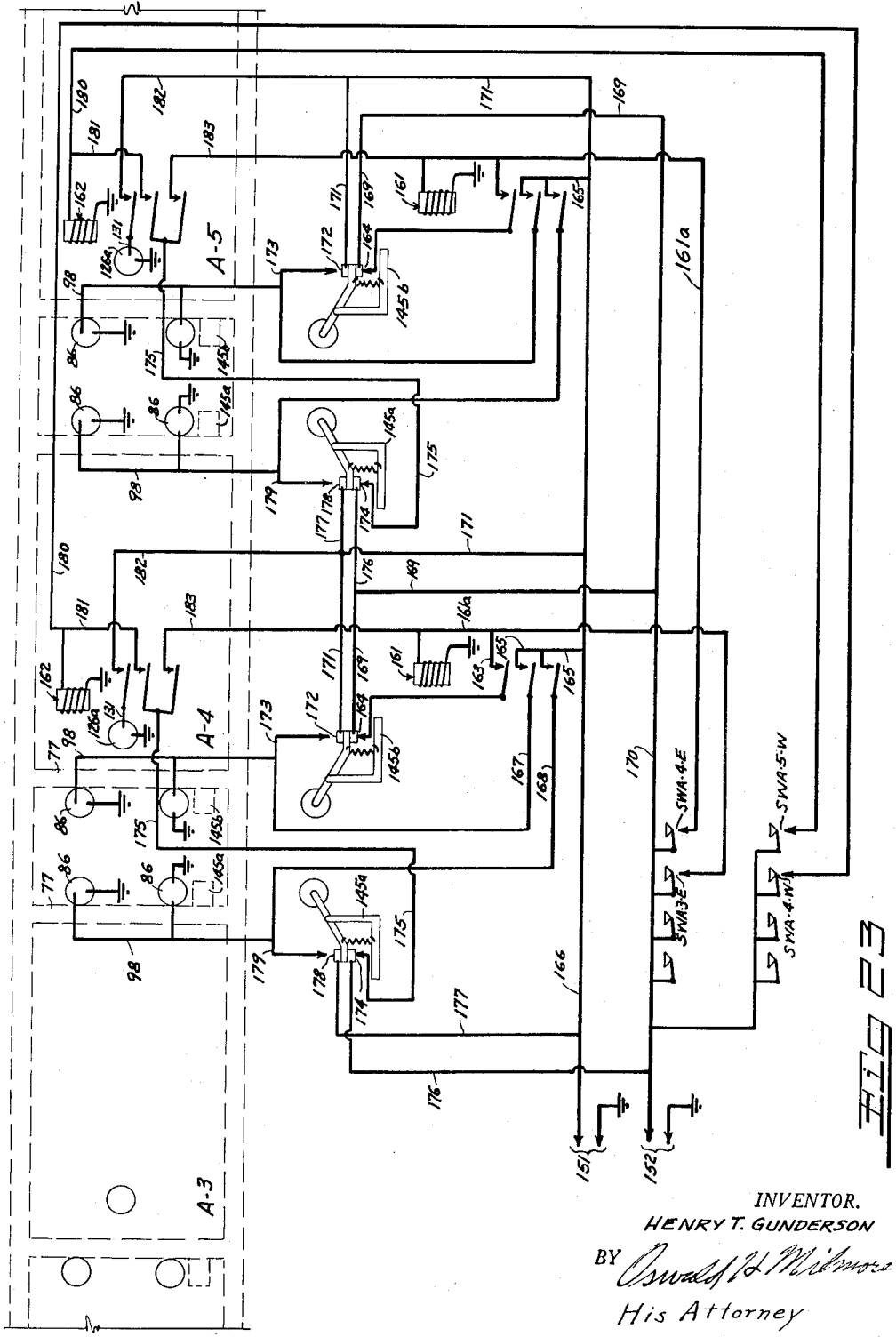

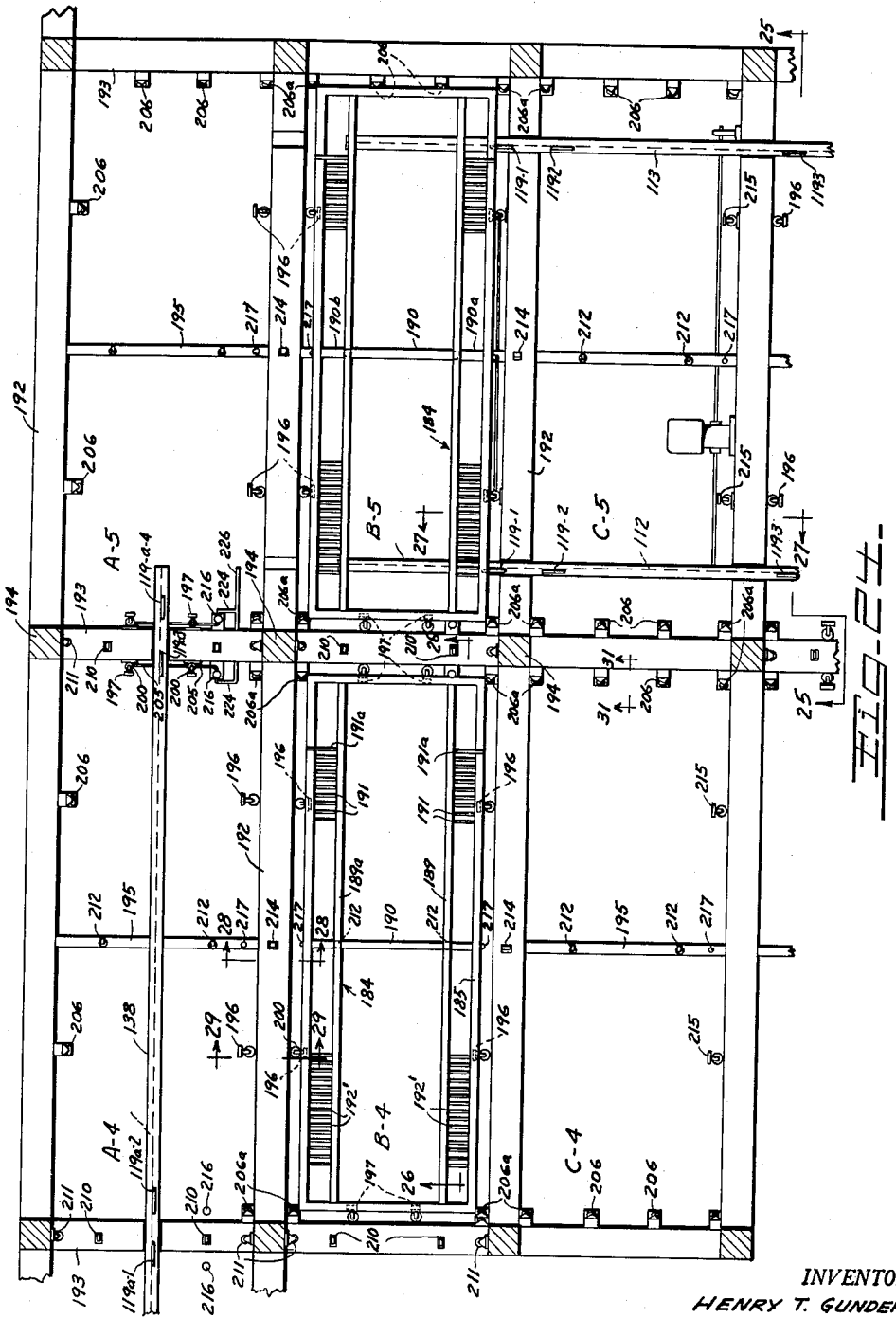

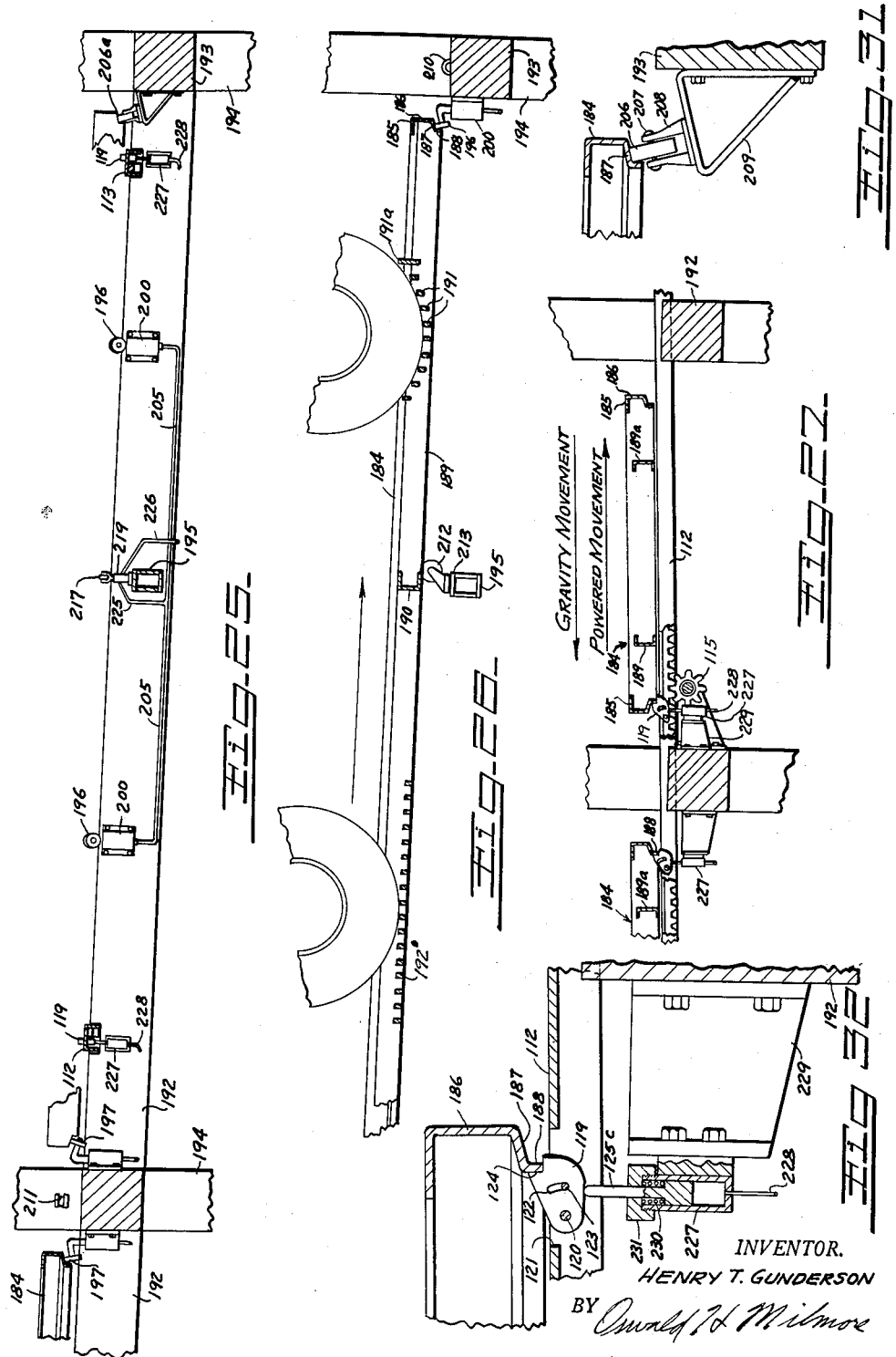

Nov. 1, 1955  H. T. GUNDERSON  2,722,322
VEHICLE STORAGE AND HANDLING DEVICES
Filed Jan. 10, 1950  13 Sheets-Sheet 13

INVENTOR.
HENRY T. GUNDERSON
BY
Oswald H. Wilmore
His Attorney

United States Patent Office 2,722,322
Patented Nov. 1, 1955

2,722,322

VEHICLE STORAGE AND HANDLING DEVICES

Henry T. Gunderson, San Mateo, Calif.

Application January 10, 1950, Serial No. 137,843

25 Claims. (Cl. 214—16.1)

This invention relates to improvements in garaging and, more particularly, to equipment and to an improved method for storing vehicles and for handling the vehicles.

The equipment according to this invention greatly facilitates the movement of cars in a storage garage and effects important economy in space. The equipment and method are suitable for use either on single deck or multiple deck buildings.

The primary object of the invention is to provide an improved device for storing a plurality of vehicles supported on individual dollies or carriers on a floor in a plurality of rows in a manner to effect a maximum utilization of floor space while permitting the several vehicles to be moved about to permit any desired vehicle to be brought to the exit point.

A further object is to provide an arrangement for moving dollies about a floor whereby progressive movement of the dolly along each row and between rows from the entry point toward the exit point is on a down grade and effected by means of gravity, and the dollies from the exit point.

Still another object is to provide an improved conveyor system which will permit a dolly to be moved selectively in either of two intersecting directions or retained at a storage site against movement in either direction. The dolly is supported on conveyor rollers which are either secured to the dolly, e. g., on castor fittings, for movement on stationary supporting tracks forming a part of the storage structure or "floor," or mounted on said structure to afford rolling support to tracks carried by the dolly; both of these arrangements are herein referred to as roller conveyor systems.

A further object is to provide a powered translating mechanism for moving dollies upgrade in a roller conveyor system having a plurality of storage sites arranged in a row, said mechanism being adapted to move any selected dolly or group of dollies in said row upgrade simultaneously and to leave non-selected dollies in said row at their respective sites unaffected by operation of the mechanism. Ancillary thereto, it is an object to provide a translating mechanism which will not interfere with the normal operation of the roller conveyor system for movement of selected dollies thereon by force of gravity.

A further object is to provide an improved dolly suitable for supporting and transporting a vehicle, said dolly having one or more depressions for receiving one or more wheels of the vehicle in a manner to prevent lateral slippage and forward or rearward rolling of the wheel on the dolly, thereby securing the vehicle on the dolly solely by force of gravity, said dolly being further adapted for use in combination with a loading and/or unloading device for lowering the vehicle wheel into or for raising the wheel out of said depression. A related object is to provide a simple arrangement for loading and unloading vehicles onto and from such dollies, comprising wheel-supporting plungers or supports spaced to conform to the treads of the vehicle wheels and mounted so as to permit relative vertical motion between the plungers and the dolly, the dolly having one or more openings permitting the plungers to extend upwardly therethrough to provide a substantially level roadbed for supporting the vehicle, whereby the vehicle can be moved into a position over the dolly or moved off of the dolly on said roadbed. It is evident that either the plungers or the dolly may be made to move vertically to effect the above-mentioned relative vertical motion; in the illustrative embodiment to be described in detail the plungers are stationary and the dolly is moved vertically.

Another object is to provide an improved dolly suitable for supporting and transporting vehicles having four wheel-receiving depressions, one pair of depressions for the wheels at one end of the vehicle being curved to conform to the wheel tread for securing the wheels against rolling movement, and the other pair of depressions being elongated longitudinally to accommodate vehicles having different wheel bases, whereby the wheels at both ends of the vehicle can be secured against lateral slippage with respect to the dolly.

Still another object is to provide an improved conveyor system for handling empty dollies at the vehicle loading and unloading stations.

Another important object is to provide a vehicle storage system that can be constructed at a relatively low cost.

Other objects of the invention will become apparent from the following description.

In summary, according to the invention vehicles to be stored are loaded onto individual dollies at a loading station and the loaded dollies are moved by a roller conveyor onto a storage floor. The term "floor" is used herein to denote a generally horizontally extended storage space having means for supporting the dollies, without implying the presence of continuous flooring. The storage floor may be at the same level as or at a level different from that of the loading station, i. e., it may be one of a tier of superposed decks arranged as storage floors, and loaded dollies may be raised or lowered from the loading station to the selected storage floor by any suitable lift, such as a vertically movable elevator or an inclined conveyor, the specific means for moving the dolly to the storage floor level forming no part of the instant invention.

The storage floor is constructed to provide a plurality of storage sites arranged as a grid, i. e., as a plurality of parallel longitudinal rows, the sites in adjacent rows being located to form a plurality of parallel transverse rows of sites. The floor is provided with a system of roller conveyors establishing communication between sites for the transfer of dollies thereon from site to site. One or more sites are used as entry sites and one or more sites are used as exit sites, it being understood that these sites, e. g., the entry and exit sites, are in some instances used only for transient storage of dollies and may accommodate elevators. The conveyor system comprises idler conveyor rollers, mounted either on the dollies for travel on stationary supporting tracks on the structure constituting the storage floor or on the storage floor for engagement with tracks on the dollies, the tracks and the rollers which are mounted on the storage floor structure being herein generically denoted as roller conveyor courses. Each storage site (with the optional exception of the entry and exit sites) is in communication through roller conveyor courses with at least two adjacent storage sites, and at least some sites have roller conveyor courses establishing communication with more than two adjacent sites and suitable switching devices for permitting selective movement of the dollies over these courses, so as to provide a plurality of continuous paths starting at an entry site, traversing successive intermediate sites, and terminating at an exit site for the movement of loaded dollies along said paths. Thereby the dollies can be moved from an entry site to any of several intermediate storage sites, and subsequently moved from such intermediate storage sites to the exit site, such movement being effected either by gravity or by a power drive. Preferably, the entry and exit sites are located in different transverse and in different longitudinal rows of the grid, and roller conveyor courses are provided so that every storage site within at least the part of the grid having said entry and exit sites at its corners is in at least one continuous path connecting the entry site and the exit site.

According to a preferred arrangement forming an important feature of the invention the sites are mounted at different elevations so that all roller conveyor courses in the longitudinal rows and inclined downwardly in a common longitudinal direction and that all roller conveyor courses in the transverse rows are inclined downwardly in a common transverse direction, so that two diagonally opposite corners of the grid are at extreme elevations. At least one entry site is at or near the highest corner of the grid and at least one exit site is at or near the lowest corner, so that vehicles can move by force of gravity from each entry site through successive storage sites to an exit site. When no powered translating device is used an entry site and an exit site must be provided at the highest and lowest corners, respectively, however, when a powered translating device is provided, the entry and exit sites need not be at the extreme elevations. Each site is provided with suitable individually operable means for checking the dolly thereat for storage, said means being conveniently in the form of retractable stops which may be a part of the supporting roller. By such an arrangement loaded dollies, introduced onto the storage floor at an entry site, or otherwise moved to a storage site of relatively higher elevation (e. g., by a power drive) can roll by gravity or transverse rows, or by a zig-zag path combining these movements in any sequence by means of the switching devices, and stored in any selected storage site.

Each storage site may be provided with roller conveyor courses connecting it to every adjacent site, thereby permitting continuous movement of the dolly along every row; every site may then be a switching site. However, as was indicated above, it is not necessary that every site be provided with a switching mechanism, and downgrade movement from certain sites may be in but one direction; similarly, one or more points along certain rows may, if desired, be unutilized as storage sites, for example, when such points are obstructed by columns, elevators, or other parts of the building, such as may be the case when the system is installed in a pre-existing building or near a truss, and it is a valuable feature of the system according to the invention that it can be adapted to such special requirements.

The loaded dollies move progressively from the entry point or from a relatively elevated storage site downgrade, traversing successive sites along a path which may be determined by selective operation of the switching mechanisms, e. g., by an operator at the storage floor who can observe the locations of the dollies, or at a central control station in the building provided with an indicator in the form of a display board having an electric light for each storage site for indicating the occupancy of such sites, or automatically. When it is desired to move a selected loaded dolly to the exit site for discharge therefrom and there is no free downgrade path between the selected dolly and the exit site because one or more other dollies are occupying intermediate sites, the latter dollies are, if possible, moved by gravity to other vacant sites so as to create a free path to the exit site. Should no such down-grade vacant site be available it becomes necessary to shift one or more dollies upgrade, e. g., from the vicinity of the exit site toward a storage site having a higher elevation, or toward the entry site; for this purpose the conveyor system is provided with a powered translating mechanism for moving the dollies upgrade. It is not necessary that all storage sites be equipped with such a drive and it is usually sufficient to provide a drive mechanism only along one or two rows, e. g., along two perpendicular marginal rows of the grid which intersect at a corner remote from the entrance and exit sites. Loaded dollies shifted upgrade by the translating mechanism along these rows can subsequently roll by gravity toward the exit site along any selected path.

A preferred form of powered translating or propelling mechanism comprises a translating rod extending through several sites and mounted for reciprocating longitudinal movement along a row and provided with a prime mover, such as an electric motor. The rod has a plurality of driving members spaced for engaging different dollies in different sites of the row simultaneously, the driving members being individually operable into dolly-engaging positions, whereby any selected dolly or group of dollies may be engaged. The dollies engaged by the respective driving members are moved on the conveyor courses when the translating rod is shifted by its prime mover. The driving members are arranged to be normally inoperative, so as not to interfere with downgrade movement of the dollies in the normal operation of the storage system.

According to a preferred embodiment of the drive mechanism the driving members are engaging dogs pivotally mounted on the translating rod so as to be normally in depressed, inoperative positions, but having their engaging faces so disposed in relation to their pivot axes that, once engaged with a dolly, they remain engaged so long as a continuing force is applied from the dog to the dolly. An actuating plunger for moving the dog into operative position is mounted at a fixed location in each storage site so that each dog is juxtaposed to an actuating plunger only when the translating rod is in a downgrade position. By this arrangement selected dogs are moved into operative positions by selective operation of the plungers prior to the beginning of a driving stroke of the translating rod and all dogs move away from the actuating plungers during the driving stroke. The dogs which are initially operatively engaged with a dolly remain engaged therewith after leaving the plungers until the completion of the stroke, but return to inoperative positions when the translating rod is thereafter retracted downgrade. It may be normally kept with its dogs out of registry with the plungers, so that there is no possibility of their interference with the gravity movement of the dollies.

Although the storage device can be operated with dollies of various designs, a valuable feature of the invention resides in the use of improved dollies especially designed for use with the roller conveyor courses, and having depressions for retaining the vehicle wheels, thereby obviating the need for clamping the vehicles on the dollies. Such dollies have four wheel-supporting members or platforms having upstanding retaining guides for holding the vehicle wheels against lateral slippage, and at least one and, preferably, both platforms at one end of the dolly, being upwardly concave along an arc lying in a vertical longitudinal plane conforming to the tread of the vehicle wheel so as to form a recess restraining the wheel against rolling motion on the dolly. The platforms at the other end of the dolly are preferably longitudinally elongated so as to accommodate vehicles having different wheel bases. At least the curved platforms and, preferably, all four platforms, are provided with openings, such as transverse slots or holes through which stationary or vertically movable wheel-supporting plungers can extend upwardly. The side portions of the dolly between the front and rear platforms may have a wall structure forming left and right roadbeds, but to make the dolly lighter it is preferred to omit such wall structure and provide openings through which other wheel-supporting plungers may extend. All plungers may, in a preferred construction, be fixed to or integral with a loading platform and the empty dolly spotted over the platform with its openings in juxtaposition with the plungers and then lowered to permit the plungers to project upwardly through the openings. Suitable roller conveyor courses for moving the dollies and mechanism for raising and lowering the dollies are provided at the loading platform. The vehicle may then be driven onto the platform with its wheels rolling on the plungers. When the dolly is thereafter raised the four wheel-supporting platforms thereof come into engagement with the wheels and support the vehicle. The vehicle is unloaded from the dolly by moving a loaded dolly over the same or a similar platform and then lowering it, thereby bringing the wheels to rest on the wheel-supporting plungers, from which the vehicle can be driven.

The dollies are provided with longitudinal and transverse guide faces, which may be the marginal portions or special guide flanges, to cooperate with guide means and stops on the storage floor conveyor courses. According to one embodiment, the dolly is provided with castors for moving along smooth, continuous conveyor courses. According to another embodiment, the dolly has smooth marginal supporting portions along the four sides thereof, preferably bevelled, to form supporting tracks which ride on conveyor rollers forming a part of the conveyor courses on the storage floor.

The invention further resides in the arrangement of the conveyor system for selectively stopping the dollies for storage at any selected site, and for selectively moving the dollies from a switching site in a desired direction.

The invention will be described in detail with reference to the accompanying drawings forming a part of this specification and illustrating certain preferred embodiments thereof by way of illustration and not of limitation, wherein:

Fig. 1 is a plan view of a dolly according to the invention;

Fig. 1a is a section taken on line 1a—1a of Fig. 1 showing two dollies stacked.

Fig. 2 is a plan view of a part of the loading station, showing one loading platform and a part of an adjacent platform, these platforms being empty;

Fig. 3 is an enlarged transverse section taken on line 3—3 of Fig. 2;

Fig. 4 is an enlarged longitudinal section taken on line 4—4 of Fig. 2;

Fig. 5 is a longitudinal section taken on broken section line 5—5 of Fig. 2 showing a dolly in depressed position ready for receiving a vehicle;

Fig. 6 is a diagrammatic plan view showing one possible layout of a storage floor and indicating the directions of movement of the dollies, parts of the loading and unloading stations, which may be located at a different level, being also shown;

Fig. 7 is a diagrammatic plan view of the loading station;

Fig. 8 is a diagrammatic plan view of the unloading station;

Fig. 9 is an enlarged, fragmentary plan view showing the roller conveyor courses, powered translating device, and associated mechanism at certain storage sites at the north-east corner of the floor;

Fig. 10 is a further enlarged plan view of the entry site showing the elevator therein;

Figs. 11, 12 and 13 are enlarged sectional views taken on correspondingly numbered section lines of Fig. 9;

Fig. 14 is a detail view of one of the actuating plungers for the translating mechanism shown in Fig. 13;

Figs. 15 and 16 are diagrammatic plan views of the translating rods in their southern and intermediate positions, respectively, illustrating their relation to the sites and to their actuating plungers, the sites being not drawn to scale;

Figs. 17 and 18 are plan and elevation views, respectively, of a portion of a channel beam constituting a track, showing the arrangement of a hinged support for closing the notch when the translating rod is retracted;

Fig. 19 is a detail view of a fixed roller;

Fig. 20 is a detail view of a vertically reciprocable roller;

Fig. 21 is a detail view of a fixed corner roller;

Fig. 23 is a schematic diagram of a portion of the control circuit for controlling longitudinal movement upgrade and downgrade movement of the dollies along the northern row;

Fig. 24 is a plan view of a portion of a modified storage floor using conveyor rollers attached to the storage floor instead of to the dollies;

Figs. 25, 26 and 27 are enlarged sectional views taken on correspondingly numbered section lines on Fig. 24;

Fig. 31 is a detail view of a fixed inclined conveyor roller; and

Fig. 32 is a detail view of the driving dog, correpsonding to a portion of Fig. 27 with the actuating plunger cylinder shown in section.

Figure 22:
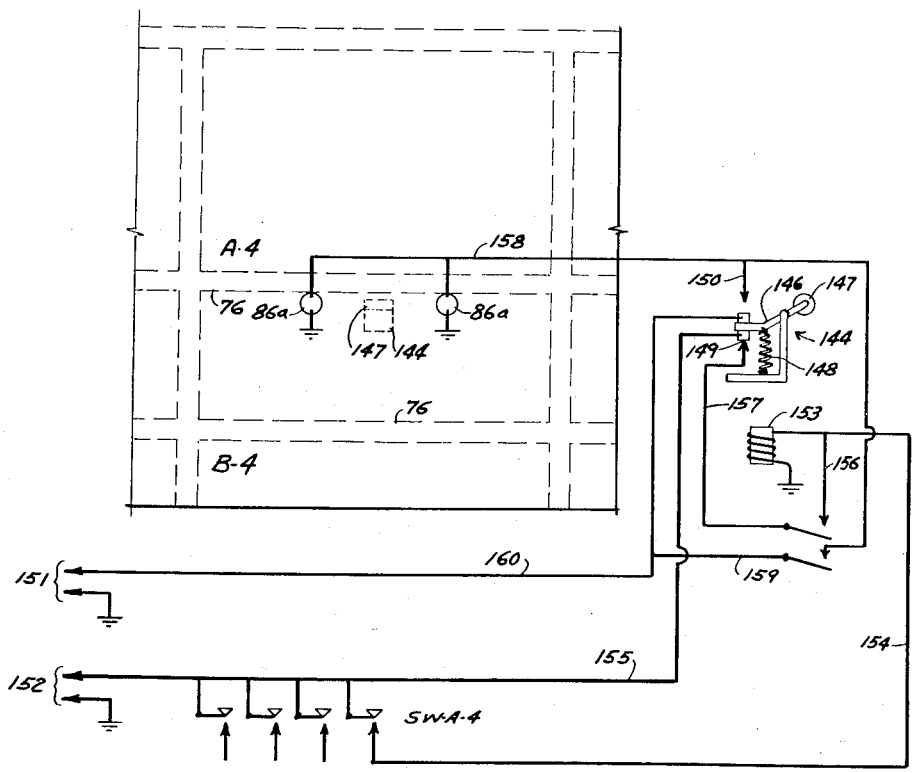
Fig. 22 is a schematic diagram of a portion of the control circuit for controlling transverse downgrade movement of the dollies.

Referring to the drawings in detail, the device will be described in chapters.

I. *The general arrangement*

Referring to Figs. 6–8, the storage floor is, for purposes of description, assumed to be arranged as a grid having eight longitudinal, parallel rows A to H, each row being oriented in an east and west direction and providing five storage sites numbered 1 to 5 from west to east within row, thereby providing forty storage sites designated A–1, A–2, . . . B–1, B–2, etc., of which the site C–2 is occupied by an elevator shaft for the delivery of loaded dollies to the floor and constitutes the entry site, and the site G–5 is occupied by another elevator shaft for the discharge of dollies and constitutes the exit site. When the floor is above the loading and unloading stations the first elevator serves as an up-elevator and the second elevator as a lowerator. The sites are spaced equally within the rows and the sites in adjacent longitudinal rows are juxtaposed so as to form five parallel transverse rows running north and south. Each longitudinal row is inclined downwardly from west to east, and each row is at an elevation lower than the adjacent row to the north of it, whereby the transverse rows are inclined downwardly from north to south. As a result the site A–1 is at the highest elevation and the site H–5 is at the lowest elevation.

Each site is provided with a roller conveyor course connecting it to adjacent sites wherever indicated by a solid arrow 30 to permit movement of a dolly downgrade by force of gravity; thus, in the embodiment shown, there are conveyor courses for downgrade movement all along the transverse rows and all along all longitudinal rows except C and E, omission of east and west conveyor courses from these two rows being arbitrary and merely for illustrating that the system can be arranged without connecting each site with all adjacent sites. Dashed arrows 31 indicate directions of movement of dollies upgrade by power driven mechanisms which are herein provided only in the north row A and in the extreme east transverse row, but which may be optionally provided in other rows if desired.

The storage floor of Fig. 6 is assumed to be above the ground floor of the building and the loading and unloading stations are assumed to be on the ground floor. As shown in Fig. 7, there is provided a pair of loading platforms or ramps L–1 and L–2, onto which empty dollies are fed on a conveyor course downgrade as indicated by solid arrows 32 from covered supply wells at W–1 and W–2. A vehicle is driven in an eastward direction onto a dolly on one of these platforms, and the loaded dolly is thereafter moved downgrade by force of gravity on conveyor courses as indicated by solid arrows 33 to sites M–1 and M–2 on opposite sides of the elevator shaft C–2′. These sites are used to hold a loaded dolly awaiting the arrival of an empty elevator. When the elevator is at the ground level a loaded dolly at site M–1 moves downgrade by gravity on a conveyor course as indicated by the solid arrow 34; alternately, a loaded dolly is moved up-grade by a suitable drive mechanism from site M–2 on a conveyor course as indicated by the dashed arrow 35 onto the elevator. These conveyors and the holding, guiding and driving mechanisms will not be further described, it being understood that they may be of any construction, such as that hereinafter described in detail for the storage floor. It is evident that a dolly on one loading platform can be loaded while a dolly is being moved onto or from the other platform, and that a dolly can be loaded on a platform while a previously loaded dolly is being moved into the elevator.

Upon being raised to the storage floor by the elevator the loaded dolly moves by force of gravity downgrade to storage site D–2. From this site the dollies roll by gravity to successive storage sites in the directions shown by solid arrows 30 along paths determined by the operator until the site G–5 is reached. There they are moved in succession by the down-elevator to G–5′ the level of the unloading station shown in Fig. 8, which comprises a pair of unloading ramps or platforms U–1 and U–2. Movement at the lower floor is by force of gravity from site G–5′ toward the south to ground-level site N–2 as shown by solid arrow 36 or by a drive mechanism to ground-level site N–1 as shown by dotted arrow 37. From sites N–1 and N–2 the loaded dollies move by gravity downgrade to unloading platforms U–1 and U–2, respectively, as indicated by solid arrows 38. The vehicle is moved off the dolly at each of these sites in an easterly direction and the empty dollies are moved by force of gravity to a covered storage stack S as indicated by the arrows 39. From the storage stack S, which is disposed in a well covered by a platform similar to that to be described for the well associated with the loading platform, the empty dollies are returned by an underground conveyor to the supply wells.

It is contemplated that the loaded dollies will be moved to the storage sites in accordance with the expected times that the vehicles are to be removed from the floor, for example, so that the vehicles to be removed soonest are stored in sites nearest to the H-row, whereby such vehicles will have free paths from their respective storage sites to the exit site G–5. When no such free path exists the interfering dollies are moved out of the way if it is desired to retain them on the storage floor, by shifting them toward the eastern or southern part of the floor by force of gravity. When such shifting necessitates clearing a vehicle from site G–5 toward the north or any northward movement along the eastern row such shifting is effected by a powered translating mechanism in that row. (This is also used for discharging any dolly in the H-row, it being contemplated that this row is to be kept empty when the load on the floor permits, and to be used primarily for clearing paths; vehicles in this row are moved by gravity to site H–5 and thence by the aforesaid power mechanism to the elevator in site G–5.) Upon reaching the site A–5 further upgrade movement may be effected, if necessary, in a westerly direction through one or more sites as indicated by the arrows 31.

Dollies thus moved upgrade may return to the exit site G–5 either by the said paths or by any downgrade path.

It is evident that it is possible to place thirty-nine loaded dollies on the floor and still permit maneuvering of the dollies to bring any selected dolly to the exit site G–5 (assuming both elevators to be at this floor), thereby permitting a maximum utilization of storage space. It will be understood, however, that any other grid arrangement may be employed, and that it is not necessary or contemplated to use the elevator sites C–2 and G–5 as storage sites. Moreover, other grid arrangements are possible, and the grid need not have a rectangular outline, it being possible to locate the elevator shafts outside of the grid and to omit one or more of the storage sites from the grid. Also, the unloading platforms U–1 and U–2 need not be at the east side of the building, but may be located near the loading sites L–1 and L–2, particularly in small installations to permit the same attendant to service both.

Fig. 6 further shows that not all of the sites need to be provided with switching arrangements for selective travel of the dollies; thus, the sites in rows C and E permit travel only in a north-south direction and no travel is possible from site G–4 to G–5; further, the sites H–2, H–3 and H–4, while permitting a dolly to enter either from the west or from the north, permit dollies to depart only toward the east. Further, the west site in each row except site A–1 is adapted to receive a dolly only from the north. Switching mechanisms would be omitted wherever not needed; for example, for economy or when movement to a site not available for storage because of occupancy by a structural part of the building, provision for movement into certain sites along certain rows may be omitted. For example, if the site C–3 were occupied by a structural part of the building, not only would the site C–2 be arranged as shown without a switching unit, but the site B–3 would also be constructed to prevent any movement southward from site B–3, and site D–3 would not be adapted to receive a dolly from the north.

II. *The dolly and loading station*

Referring to Figs. 1–5, the dolly, generally indicated at 40, has a marginal frame formed by right and left longitudinal channel beams 41 and 41a and front and rear transverse channel beams 42 and 42a, these beams having their smooth webs disposed vertically and outwardly with respect to the dolly. Longitudinal channel beams 43 and 43a are secured at their ends to the beams 42 and 42a and are spaced from beams 41 and 41a, respectively, so as to leave longitudinal spaces somewhat wider than a vehicle wheel so that such wheel can descend into the spaces without precisely aligning the vehicle on the dolly. A transverse channel beam 44 is optionally provided to stiffen the dolly frame; it has short sections 44a and 44b outside of beams 43 and 43a to provide a continuous transverse lower surface extending to the marginal beams 41 and 41a for a purpose to be described in connection with the conveyor courses. This transverse channel is located slightly to the rear of the midpoint of the dolly. Swivel castors 45a and 45b at the right and castors 45c and 45d at the left are mounted at the corners as shown in Figs. 1, 3 and 5, and auxiliary swivel castors 45e and 45f are optionally provided, these being mounted in alignment with the corner castors at the midpoints of the beams 41 and 41a. These castors provide supporting conveyor rollers extending slightly below the lower flanges of the frame beams and are rotatable about vertical axes so as to afford rolling support for the dolly for movement thereof in either longitudinal or transverse directions. The bottom flanges of the channel beams are cut away to accommodate the rollers. The frame is reinforced by corner gusset plates 46. Spacer blocks 47 and 47a are mounted on top of beams 43 and 43a near to but displaced inwardly from their rear ends, and extend above these beams for engaging the bottoms of beams 43 and 43a of adjacent higher dollies when empty dollies are stacked, as is shown in Fig. 1a. It is desired to have the castor rollers of such stacked dollies spaced from the beams of the next lower dolly to permit a flange of a structural beam forming a supporting track to be inserted beneath the rollers, and for this purpose the main supporting portions of the spacer blocks 47 extend above the dolly frame for distances exceeding somewhat the distances that the rollers project beneath the frame; further, the spacers are set inwardly toward the dolly center from the transverse line joining the axes of castors 45a and 45c. The spacer blocks have vertical projections 47b extending above the support portions to engage the inner edges of the beams 43 and 43a of the higher dolly for preventing lateral slippage.

A group of transverse bars 48 is welded between the beams 41 and 43 at the front, and a similar group of bars 48a is welded between the beams 41a and 43a, to provide right and left, respectively, front wheel-supporting platforms. These bars are welded at their ends to the vertical webs of the channel beams and are spaced apart so as to provide a series of transverse slots between them. The bars are horizontal and are mounted at progressively different heights conforming to the arc of a circle having a radius equal to the radius of the tread of an average or large automobile tire. The foremost bar 48b and 48c of each group only extends above the dolly frame; each of these foremost bars has a portion thereof extending outwardly over the beam 41 or 41a for engagement with a corresponding beam of another dolly to function as front spacer means. They extend above the beams for the same distance as the main support portions of spacers 47 and 47a at the rear. These bars 48c also facilitate positioning of the vehicle over the dolly in a manner to be described. It is seen that the bars 48 and 48a form recesses or depressions having upwardly concave, perforated bottoms adapted to support vehicle wheels and to retain them against rolling motion as well as against lateral slippage. These recesses are made sufficiently deep to prevent forward or rearward movement of the vehicle although the brakes are not set and the dolly is positioned on a moderate incline.

Two additional groups of transverse bars 49 and 49a are welded between the marginal pairs of longitudinal beams near the rear to form rear wheel-supporting platforms. These bars are similarly spaced apart to provide slots between them but are more numerous so as to extend over a longer longitudinal distance and accommodate vehicles of different wheel bases. They are set at a common elevation corresponding to the lowest bars of the groups 48 and 48a, so as to permit mounting of the vehicle at zero grade with respect to the dolly and to restrain the rear wheel against lateral slippage. While this is the preferred construction, certain modifications may be made without departing from the scope of the invention; thus, the spacing between the bars in groups 49 and 49a, provided for permitting wheel-supporting plungers to project upwardly, may be dispensed with and imperforate rear wheel-supporting platforms may be used, since the rear wheels are not restrained against rolling motion. It may be further noted that, while transverse bars 48 and 49 were described, any construction providing a perforated bottom may be used for supporting the wheels, for example, in the nature of projections or fingers such as the fingers 29 shown in the U. S. patent to Becker, No. 2,041,351.

The mechanism for feeding the dollies to the loading station and for moving the loaded dollies away from the loading station will next be described. The general arrangement of the loading stations is shown in Fig. 7, and Fig. 2, shows a detail view of one of the platforms L–2 and a portion of the adjacent platform. The platforms and their wells are the same and only one will be described. Referring particularly to Figs. 2–5, the platform L–2 is mounted next to a well W–2 having an outline larger than the dolly frame and provided with a vertically movable table 50 supported by a shaft 51 actuated by suitable hydraulic mechanism, not shown. The table carries a pair of longitudinal channel beams 52, the upper flanges of which provide track surfaces for supporting the roller castors on the dollies. The well is provided beneath the ground level with a conveyor, not shown, by which the dollies are moved into the well at a level above the table 50 when the latter is retracted downwardly. When the table is raised the dollies are stacked successively on the table, two such dollies 40a and 40b being shown in Fig. 3. A pair of brackets 53 is mounted at each end of the well and afford pivotal support to arms 54 for rotation about horizontal axes. Each pair of arms 54 at the same end of the well is connected at the upper ends by an angle beam 55 which normally rests on stationary abutments or supports 56 secured to the sides of the well. The beam 55 at the east side is at a slightly lower elevation than the other beam 55. The length of the well exceeds slightly the length of the dolly whereby the beams 55 may be swung upwardly by engagement with the top of the dolly frame when the stack of dollies is raised by the table 50. After the uppermost dolly has been raised to above the level of the angle beam 55 the latter drops back by gravity causing its normally horizontal flange to enter the space between the upper two dollies. Due to the vertical spacing of the dollies effected by spacers 47, 47a, 48b and 48c, the angle beam moves into supporting relation to the castor rollers on the uppermost dolly. The table 50 is thereupon retracted downwardly.

A pair of guide rollers 57 rotatable on vertical axles mounted in brackets 58 carried by angle beams 55 engage the outer vertical walls of the end channel beams 42 and 42a. Niches 59 are provided in the end walls of the well to accommodate these guide rollers and their brackets when the beams 55 are pivoted upwardly. The well is covered by a platform 60 extending beyond the well and curved to a point to form a protective curbing for the roadway. This platform 60 is used by passengers alighting from a vehicle on loading platform L–2.

Each loading platform comprises a concrete structure 61 having a flat upper face inclined downwardly from north to south and from west to east with respect to the positions shown in the drawings, and having its west end at the level of the approach roadbed or ramp. This structure has grooves in its upper surface to permit the dolly to be nested so that all parts of the dolly except the spacers 47 and 47a and the bars 48b and 48c are beneath the platform level. Thus, there is provided a peripheral groove 62 extending in the form of a rectangle for receiving the channel beams 41, 41a, 42 and 42a, within which is mounted a vertically movable rectangular frame 63. This frame can be raised to a position flush with the top of the platform (as shown in Fig. 3 for platform L–2) to permit castor rollers to move thereon without obstruction, and is retractable for a distance slightly in excess of the vertical thickness of the dolly from the bottom of the roller to the top of the dolly frame (as shown in Fig. 3 for the platform L–1 and as shown in Fig. 5). Frame 63 is actuated by any suitable jack means, such as hydraulically powered pistons 64 vertically reciprocable within cylinders 65 mounted beneath the frame 63 and provided with suitable conduits (not shown) for hydraulic fluid. Additional longitudinal grooves 66 are provided in the platform for the longitudinal channel beams 43 and 43a, and a transverse groove 67 is provided for the channel beam 44. Short transverse grooves 68 at the front connect each pair of longitudinal grooves 62 and 66 at the front to accommodate the bars of groups 48 and 48a on the dolly. A similar group of short transverse grooves 69 at the rear accommodate the bars of the groups 49 and 49a. The post-like portions 68a and 69a of the platform constitute wheel-supporting plungers which project upwardly through the slots in the wheel-supporting platforms of the dolly for supporting the vehicle and providing a level roadbed for the vehicle when the dolly is nested in the grooves.

Stationary guide rollers 70 are pivotally mounted on the platform in alignment with the guide rollers 57, both at the east and west ends, for engaging the short ends of the dolly frame during southward movement thereof. At the southern, downgrade side of the platform there are side guide rollers 71, pivotally mounted on upright journals fixed to the southern bar of the frame 63 for checking the southward movement of an empty roller and, subsequently, for guiding the eastward movement of a loaded dolly. No guide rollers are provided along the north side of the platform because the dolly is urged by gravity against the rollers 71. Guide rollers 72 at the east end of the platform are pivotally mounted on upright, vertically reciprocable journals for guiding the empty dolly. These journals are actuated and supported as described hereinafter for the roller 86 with reference to Fig. 20. It will be noted that the guide rollers in each row are placed sufficiently close together so that at least two rollers of each row will be in engagement with the juxtaposed side of the dolly frame, thereby insuring rectilinear motion. Although gravity urges the dolly toward the east as well as south, a row of guide rollers is preferably provided along the west side to obviate any chance of canting of the dolly in view of the fact that its ends are short in relation to the length.

The operation of the loading station is as follows: When the platform L-2 is empty and the frame 63 is in raised position, the table 50 is raised to elevate the uppermost dolly resting thereon to above the level of the pivotally mounted angle beams 55; when the table is retracted the uppermost dolly is retained on these beams as indicated by reference number 40c. The dolly 40c immediately rolls southward by force of gravity, guided by rollers 57, 70 and 72 until checked by engagement of the southern side of the dolly with rollers 71. The center castor 45e is unsupported during the passage thereof over the longitudinal grooves 66, but the end castors afford adequate support for the empty rollers. The frame 63 is then retracted by means of the pistons 64 to nest the empty dolly in the grooves. Only parts of the spacers 47 and 47a and parts of the bars 48b and 48c now extend above the platform surface. An automobile may then be driven eastward onto the platform, moving on a slight downgrade and supported entirely by the platform until the front wheels thereof engage the upwardly projecting bars 48b and 48c. The automobile is then stopped.

To move the loaded dolly from the loading platform the frame 63 is elevated by means of its pistons, thereby raising the dolly and affording a track for the castor rollers at the level of the platform. As the dolly rises the short transverse bars of the wheel-supporting platforms are brought into engagement with the bottoms of the wheels, and the vehicle wheels are lifted off the plungers 68a and 69a. The guide rollers 72 are retracted by applying electrical current to its solenoid, thereby releasing the dolly for downgrade movement by gravity to site M-2.

The guide rollers within the sites M-1 and M-2 and the tracks for supporting the castor rollers are not described in detail herein, it being understood that they are in all respects similar to the guide rollers and conveyor courses to be described for the storage floor.

III. *The conveyor courses at the storage floor*

The details of the storage floor are shown in Figs. 9–12 and 17–21. Referring first to Figs. 9–12, the garage building is shown to have columns 75 supporting outer horizontal beams 73 and brackets 74 at their east and west sides. Channel beams 77, extending north and south, rest on brackets 74 and support longitudinal channel beams 76 extending east and west. The columns 75 are located at the corners of storage sites which are dimensioned to accommodate individual loaded dollies, two of which are shown occupying sites B-4 and B-5 from which the vehicles were omitted for clarity. It will be noted that, except as noted below, each storage site has its own beams 76 and 77 on all four sides spaced to conform to the spacings of the corner castor rollers on the dolly, so that the dolly may roll either along an east-west line of travel supported on beams 76 or along a north-south line of travel supported on beams 77. In other words, a beam 77 is provided near to each east and west side of each column. Beams 76 do not extend through to the columns, but short beams 76a run past the columns in alignment with the beams 76. Beams 76 and 76a are mounted on an incline, sloping downwardly from west to east, and beams 77 are sloped downwardly from north to south. A transverse channel beam 78 is secured to the channel beams 76 within each site, extending north and south at the midsection of the site, and short channel beams 78a, in alignment with the longer beams 78, extend between sites. Channel beams 76 are not needed and may be omitted at sites where no east-west travel of the dolly is contemplated, for example along the north and south margins of sites in rows C and E; however, in Fig. 9 such channels are provided also in sites in rows C and E to afford support to transverse channel beams 78. The upper faces of the beams 76, 76a, 77, 78 and 78a are smooth, continuous, and coplanar and afford support to the castor rollers on the dollies, thereby constituting the conveyor courses for movement of the dollies between sites.

The dollies are constrained to rectilinear motion between sites along longitudinal and transverse rows of the floor and retained against movement by marginal guide rollers and stops. The guide rollers are all mounted for rotation about vertical axes for engaging the outer margins of the dolly frames, and the stops similarly engage the frames. In the embodiment shown three types of guide rollers are provided: (*a*) At the sides of sites across which the dollies do not move (i. e., at the margins in Fig. 6 having no arrows across them, except at the north margin of sites in row A, where guide rollers are optionally omitted entirely) rollers 79 or 79a, vertically fixed, are provided. (*b*) At the sides of sites across and along which the dollies move, vertically movable guide rollers 86 or 86a are mounted; these rollers function as guide rollers when the dolly moves along them and also function as retractable stop members for holding the dolly at the respective site against downgrade movement across the row of rollers until they are retracted. (*c*) At the corners of the interior columns 75 fixed rollers 99 are provided for engaging the dollies while in transit between sites; they are disposed to be effective both for engaging the ends of the dollies during transverse (north and south) movement and for engaging the sides of the dollies during longitudinal movement thereof. In addition, retractable stop members are provided at the downgrade sides of sites along which no movement of dollies takes place but across which dollies move, e. g., at the southern sides of sites in rows C and E; these stops are designated by reference number 104, but retractable rollers such as the rollers 86 may be used as retractable stops. Guide rollers are provided at the east and west sides of the sites for engaging the short ends of the dollies and preventing canting, but are optionally omitted from the north sides of all sites. Wherever guide rollers are provided they are spaced sufficiently close together to insure that at least two rollers of the same row are in engagement with the dolly at all times.

A typical fixed guide roller 79 is shown in Fig. 19 in engagement with the front end beam 42 of a dolly frame. The roller is journalled on a vertical spindle 80 supported in a bifurcated bracket 81 which is bolted to an angle piece 82 which is afforded rocking vertical support from the beam 77 by a tongue 83 extending into an aperture in the beam web. The upper end of the angle piece is resiliently held against the beam web by a bolt 84 slidable in the web and a coiled compression spring 85. The spring 85 is sufficiently stiff to maintain a loaded dolly statically against downgrade movement in the position shown in Fig. 19, but has sufficient resiliency to permit the roller to move to the right (as viewed in Fig. 19) by pivoting about the tongue 83 upon impact by a moving dolly to absorb the shock. It is evident that the spring 85 may be omitted and the piece 82 rigidly fixed to the web of beam 77 in cases where there is no occasion to absorb shock, e. g., at the east and west sides of all sites in rows C and E; such rollers, designated 79a in Fig. 9, are in all respects save in the omission of the spring 85 like that shown in Fig. 19 and need not be further described.

Locations for the rollers 79 and 79a are shown in Fig. 9, wherein it is seen that there are at least two such rollers within each site and that two fixed rollers 79a may also be mounted between each pair of sites along the extreme eastern beams 77. (The special case of sites C-5 and E-5 will be described below.) Although not shown in Fig. 9, it is evident that a like arrangement is followed along the extreme western beams of the storage floor, and also along the extreme southern beam 76. Rollers 79a are shown at the east and west margins of sites in row C, it being understood that the same arrangement is followed for sites in row E wherein there is also no east and west movement and the dollies never cross the east and west sides of the sites.

A typical vertically movable guide roller 86 is shown in detail in Fig. 20, in engagement with a beam 42 of a dolly frame. Each roller 86 is journalled on a spindle 87 which is vertically guided and movable within a bushing 88 fixed in a bracket 89 and extends through a solenoid within a housing 90, forming an armature therein. The lower end of the spindle extends through a second bushing 91 which is also fixed to the bracket 89 and the spindle is urged upwardly by a compression spring 92 bearing against the bracket and an abutment collar 93 fixed to the spindle. Upward motion of the spindle is limited by a cotter pin 94. The bracket 89 has a tongue 95 extending movably into a hole in the web of beam 77 for rocking vertical support and the upper end of the bracket is secured resiliently by a bolt 96 slidable in the web and by a coiled compression spring 97. The spring has the characteristics previously described for spring 85. The roller 86 is normally maintained by the spring 92 in the raised position shown, but may be retracted to a level below the bottom of the dolly frame when the solenoid is energized through an electric circuit 98. It is evident that the resilient mounting is not needed in some cases, e. g., along the southern sides of sites in row A, and that the bracket 89 may in such cases be secured rigidly to the channel 76; such rollers are designated by reference number 86a and, being in other respects similar to the roller 86, need not be described in detail.

Typical locations for the rollers 86 and 86a are shown in Fig. 9, wherein it is seen that two such rollers are mounted at each side of a site provided with retractable rollers.

A typical fixed corner roller 99 is shown in Fig. 21, rotatable about a vertical journal 100 fixed in a bracket 101 having mutually perpendicular tabs 102 and 103 by which it is bolted to the webs of channel beams 77 and 76a. The roller 99 is tangent to the vertical outer faces of these beams to engage dollies traveling either longitudinally or transversely. Four such rollers are mounted at the corners of each interior column 75 wherever dollies pass in both directions, e. g., at the column between sites A-4, A-5, B-4, and B-5, as shown in Fig. 9. They are operative to engage dollies moving either along north-south or east-west lines of travel. At columns adjoining sites in rows C and E, they may be omitted from the sides of the columns facing toward these rows. For example, the column between sites B-4, B-5, C-4 and C-5, as well as the column to the south of it, have only two rollers 99. In these cases a better spacing of the guide rollers is attained by mounting three guide rollers 79a within each site in the row C, as shown.

The vertically movable stops 104 are not shown in detail, since a detail view thereof would be in all respects identical with Fig. 20. The only difference in construction would be that the stop member, mounted on the spindle 87 and corresponding to the roller 86, need not be rotatable on the spindle.

IV. *The elevators*

The elevator is shown in enlarged plan view in Fig. 10. Only the relation of the elevator to the conveyor courses will be described because the elevator itself forms no part of the present invention, and elevators are well known per se; for example, the aforesaid patent to Becker, 2,041,351 shows an elevator for automobiles with control devices.

There is shown an elevator 105 in site C-2 having transverse beams 106 at its ends and a transverse, intermediate beam 107 at its midsection forming three parallel tracks for supporting the six castors. These tracks are inclined downwardly toward the south and the east track is at a lower elevation than the west track, so that the surfaces of these tracks are coplanar with the conveyor courses at the floor when the elevator is thereat for discharging a dolly. The track beams are held together by a frame comprising longitudinal girders 108. The elevator is suspended from four cables 109 secured to connectors 109a at the ends of the girders. Guide blocks 110 are fixed to the elevator frame at the corners for sliding engagement with vertical guides 111 fixed to the building columns 75. Four fixed rollers 79a are mounted on each of the tracks 106 for engaging the ends of the dolly on the elevator, and a pair of retractable stops 104 is mounted on the girder 108 on the downgrade side. The stops 104 are normally raised to prevent downgrade movement of a dolly from the elevator, and may be retracted downwardly by an electrical solenoid as described previously for Fig. 18. The electrical circuit for energizing these solenoids is provided through flexible conduits between the building and elevator, as is well known in the art.

It will be noted that the tracks 106 and 107 extend close to the beams 77 and 78a of the adjoining sites B-2 and D-2, whereby a dolly can roll between the storage floor and the elevator on either side of the elevator. It can move southward from the elevator by force of gravity when the stops 104 are retracted; it may be moved southward from site B-2 when the rollers 86 are retracted. Northward movement into and from the elevator is possible when a powered translating mechanism, such as that described for elevator site G-5, is provided.

The elevator at site G-5 for discharging dollies from the storage floor is of identical construction.

V. *The powered translating mechanism*

A powered translating mechanism may be provided along any desired row, and their numbers and locations are matters of choice. Only two mechanisms are shown in Figs. 9, and 12–18. A translating mechanism is provided for the eastern sites (A-5, B-5, . . . to H-5), and another, independent translating mechanism is provided for the sites in row A. These translating mechanisms all operate on the same principle, and only the first of these will be described in detail.

The translating mechanism in the eastern transverse row comprises a pair of parallel translating rods 112 and 113 in the form of inverted channels extending in a north and south direction and slideably mounted in notches 136 in the channel beams 76, near the east and west ends of the sites so as to engage the dollies near their ends and to avoid weakening the channel beams.

These rods extend through a distance of several feet in excess of the space occupied by five sites, so that when they are in their northern positions they are clear of the elevator shaft in site G-5; they are movable through a distance slightly in excess of two sites, so as to engage a dolly in site H-5.

The rods 112 and 113 have gear racks 114 at their lower sides extending through lengths slightly in excess of the width occupied by two sites and off-center toward the east. These racks mesh with spur gears 115 fixed to a common shaft 116 which is driven by a reversible electric rotor 117 through a reducing gear and a known torque-limiting unit 118, for reducing the shaft speed and permitting slippage in the event that an excessive torque is applied to the shaft. Each rod carries seven dogs 119 which are positioned so that any number up to six different dollies in different sites can be engaged simultaneously. The spacing of these dogs along the rods and the reason for the seventh dog will be explained hereinafter.

Considering the dogs in detail, as shown in Fig. 14, it is seen that the rod 112 is an inverted channel with two parallel vertical flanges guided in notches in the beams 76. The top, horizontal web of the channel is at the level of the top flange of the beams 76 so as to continue the upper surface of the latter and provide a continuous support for the castor rollers which move eastward along these beams. Each dog is pivotally mounted on a horizontal pin 120 and can extend upwardly through a slot 121 in the upper web of the rod. An arcuate slot 122, concentric with the pin 120 is provided in each dog through which extends a stationary, horizontal stop pin 123 for limiting the pivotal movement of the dog. The dog normally occupies a lower position, entirely beneath the top of the rod 112; when raised to the position shown in the drawings its northwardly directed shoulder 124 engages a beam 40 or 41a of a dolly 40. Hence, when the dog 119 is depressed it will not engage a dolly at its respective site, but when it is raised by any suitable actuating means, such as the plunger 125, at the beginning of an upgrade movement of the rod the dog will engage the dolly and move it upgrade. The dogs, therefore, constitute driving members on the translating rod having inoperative (lowered) and operating (raised) positions. The dog will remain in engagement with the dolly even after movement of the dog away from the plunger 125 because the reaction of the dolly against the shoulder 124 is along a line above the axis of the pivot pin 120, thereby tending to rotate the dog in a counter-clockwise direction (as viewed in Fig. 14), such rotation being prevented by the portion of the dog in engagement with the bottom of the dolly beam and by the fixed stop pin 123. When the reaction of the dolly against the dog ceases, as occurs after the dolly has been advanced to a higher site and is retained there by a vertically reciprocable roller 86 or 86a and the rod 112 is retracted slightly, the dog falls by gravity to its lower position to an extent limited by the stop pin 123. It will be understood that the rod 113 is of like construction. When not in use these rods are normally positioned near their extreme northern position to be entirely clear of elevator site G-5, but filling the notches 136 in the beams 76 at the southern sides of sites A-5 and F-5, as indicated in Fig. 16.

The dogs 119 are actuated by vertically reciprocable plungers 125, vertically movable in solenoids 126, there being two such plungers and solenoids (one for each of the two rods) for each of the sites B-5 to H-5, inclusive. Referring to Figs. 15 and 16, the plungers are located to be near the part of the dolly to be engaged by a dolly, and the plungers for the site G-5 are mounted in the elevator operable therein. To permit the use of short rods these plungers are located at the southern sides in sites B-5 and C-5 (whereby the dollies therein will be engaged at their southern beams 41) and at the northern sides in sites D-5 to H-5, inclusive (whereby the dollies therein will be engaged at their northern beams 41a). This different engagement of dollies in different sites is shown in Fig. 13. Considering now the spacing of the dogs on the translating rods 112 and 113, it will be recalled that these rods are movable through a distance slightly in excess of two sites, so that they have three stationary functional positions: (1) A northern position, extending from a point near the northern side of site A-5 to a point slightly south of the northern side of site F-5; (2) an intermediate position, extending from site B-5 into site G-5 as shown in Figs. 9 and 16; and (3) a southern position extending from site C-5 into site H-5 as shown in Fig. 15. The dogs are positioned so that, when the rods are in the southern position, the four southern dogs are above the plungers 125 in the sites E-5 to H-5, inclusive, and the two northern dogs are above the plungers in sites C-5 and D-5; this requires that, as shown in Fig. 15, the two dogs 119-1 and 119-2, at the northern end, be close together, and that the dogs 119-2, 119-4, 119-5, 119-6 and 119-7 be equally spaced at intervals corresponding to the width of one site. The third dogs 119-3 are not operative in the southern position of the rods; they are located on the rods so that they are above the plungers in site C when the rods are in their intermediate position, as shown in Fig. 16. In the intermediate position the dogs 119-2 are inoperative; dogs 119-1 are over the plungers in site B-5; and dogs 119-4 to 119-7, inclusive, are over plungers in sites D-5 to G-5, inclusive.

It will be noted from Figs. 9, 15 and 16 that the dogs are somewhat to the west of the center lines of the translating rods; this permits the gear racks 114 to be mounted east of the center lines. The plungers 125 are similarly offset slightly to the west of the center lines, so as to be beneath the dogs to be actuated thereby.

Referring again to Fig. 14, the plunger 125 is seen to be vertically slidable within a solenoid 126 having a tubular core 127 and a mounting bracket 128 by which it is supported from the web of beam 76. It is urged downwardly by a spring 129 abutting the bottom of the core 127 and a collar fixed to the bottom of the plunger by a cotter pin so as to bring a limit collar 130 which is fixed to the plunger into engagement with the top of the core 127 when the solenoid is not energized. An electrical circuit 131 is connected to the solenoid; when it is energized the plunger, acting as an armature, is raised to the position shown. The plungers and their solenoids are of the same construction at the several sites.

To operate the translating mechanism the translating rods 112 and 113 are first shifted to their southern or intermediate positions, as shown in Fig. 15 or 16, respectively. In these initial positions the translating rods are slightly downgrade from the positions shown in Figs. 13 and 14, bringing the pivot pins 120 farther to the left from the lines of motion of plungers 125. This obviates any chance for engagement of the highest part of the dog with the bottom of the dolly. The circuits 131 to the solenoids at those sites from which it is desired to move a dolly upgrade are then selectively energized. This raises the corresponding plungers 125, thereby pushing the respective dogs 119 upwards into operative positions for engaging the dollies. The rollers 86 or 86a or stops 104 which are to be traversed by the selected dollies in their upgrade movement are retracted by energizing their circuits 98. The motor 117 is then operated to move the translating rods northward through one or two sites; this first brings the shoulders 124 of the dogs into operative engagement with the respective dollies, and continued movement carries the dollies upgrade. The dogs 119 move away from their actuating plungers 125 during this movement but those dogs which were initially raised remain in operative engagement by the reaction of the dollies previously described. Circuits 131 may be deenergized at any time after the movement of the dollies is begun. Dogs which were not initially raised pass beneath their respective dollies without engaging them. Because of the curved shape at the north and lower edges of the dogs, they can slide over any plunger 125 which was left in raised position. Upon completion of the movement the retracted rollers 86 or 86a or stops 104 are again raised by de-energizing their circuits 98. The translating rods are then retracted southward slightly to move the dogs away from the dollies when the latter come to bear against their rollers 86 or 86a or stops 104, permitting the dogs to fall into inoperative positions.

When the translating rods move out of the notches 136 in beams 76 the track for the dolly castor rollers is interrupted, and some arrangement must be provided for site G–5 and is preferably also provided for site A–5 to support the dolly during travel along an east-west line. One simple expedient, shown in Fig. 9 as applied to site A–5, and indicated also in Fig. 16 as applied to site G–5, comprises beams 142 secured to the beams 76 just west of the notches 136. A swivel castor 143 is mounted for rotation about a vertical axis with the roller, rotatable on a horizontal axis, extending upwardly to a level to engage the lower side of the longitudinal beams 43 or 43a on the dolly. Thus, in the case of site A–5 the castors 143 are located near the south side, where the notch 136 is, to engage beam 43, and in the case of site H–5 they are located near the north side to engage beam 43a. The castors 143 support the side of the dolly near the notch 136 while the dolly castor roller is passing over the unoccupied notch. A different arrangement, involving the use of a hinged support, will be described with reference to the beams 77 in sites in row A but may be used for beams 76.

The powered translating mechanism for moving the dollies upgrade westward along row A is identical in principle with that just described, differing therefrom primarily in that only a single translating rod 138, located at the center line of the dollies, is provided. Further, the rod has a longer travel, in view of the longitudinal orientation of the sites, and has fewer dogs because there are only five sites in the row. In view of the identity of the principle of operation involved and of the specific details with those described above, this translating mechanism for row A will not be described in detail. This mechanism comprises a reversible electric motor 139 which acts through a reducing gear and torque-limiting friction clutch unit 140 to drive a shaft 141 carrying a spur gear (not shown) meshing with a gear rack (not shown) at the bottom of the rod 138. The rod 138 is an inverted channel supportingly guided in notches in the beams 77 with the top of the horizontal web thereof coplanar with the top flanges of these beams. Rod 138 has a length several feet in excess of the space occupied longitudinally by two sites and is movable westward through a distance slightly in excess of two sites from its easternmost position shown. It carries four driving dogs 119a, arranged for engaging up to three different dollies simultaneously. The dogs are positioned for cooperation with four vertically reciprocable operating plungers (not shown) actuated by solenoids 126a, the plungers and solenoids being constructed and arranged as previously described for plungers 125 and solenoids 126. An operating plunger is mounted at the west side of sites A–5 and of site A–4 and at the east side of sites A–3 and of site A–2. (The solenoid for site A–2 does not appear in the drawing.) The plungers and dogs are located slightly to the south of the center line of the rod 138, while the gear rack thereon is located slightly to the north of the center line. The dogs are positioned with relation to these plungers so that, when the translating rod is in its extreme eastern position shown in Fig. 9, the dogs 119a–1, 119a–2 and 119a–4 are above operating plungers and the dog 119a–3 is inoperative. When the translating rod is moved toward the west through a distance of one site all dogs except 119a–2 are above plungers. The dollies are shifted selectively along the row A either one or two sites at one stroke of the translating rod by retracting the vertically movable guide rollers 86 which are to be traversed by the dolly, energizing the selected solenoids 126a, and operating the motor 139 in the manner previously described.

To maintain continuous supporting surfaces on the beams 77 when the rod 138 is moved out of the notches 136 in these beams, so as to permit southward movement from such sites, hinged supports 132 are provided at certain sites, e. g., at the west side of site A–5 and both east and west sides of site A–4. Details of the support are shown in Figs. 17 and 18, wherein the support 132 is pivoted about a vertical hinge pin 133 supported by the web of beam 77 spaced from the notch 136 sufficiently to cause the support to swing through an arc with a relatively long radius. A spring 134 is fitted to the support to urge the latter into its operative position, shown in solid lines, with the upper horizontal flange 135 of the support bridging the gap between the flange portions of the beam 77 on either side of the notch and in coplanar relation there. An anti-friction roller 137 is mounted below the flange 135 at the corner of the support for engaging the side of the rod 138 when in the dotted line position. When the end of rod 138 engages the support and enters the notch it pushes the support out of the notch and then bridges the notch, except for a small segment of a circle indicated in Fig. 17 which can be readily crossed by the dolly roller. When the rod 138 is subsequently retracted the roller 137 prevents any binding or wedging action. After the end of the rod 138 clears the roller during the retraction stroke of the rod the support is moved into operative position by its spring 134. In operative position the bottom of the support 132 engages the bottom of the notch 136 to transmit the weight of a dolly roller passing over it. The bottom of the support has a notch 132a to avoid striking the plunger 125 should the latter be elevated. Similar hinged supports are optionally provided for sites A–1 and A–2 (not appearing in the drawing) but may be omitted because the rod 138 can be normally stowed in its west position, thereby bridging the notches 136 in these sites.

VI. *The control system*

The various electrical solenoids and the motors for the translating rods may be operated through by any suitable circuits controlled by an operator stationed at the storage floor for observing the dollies, or at a central control station provided with a suitable indicator device, such as a miniature plan of each storage floor with lights for indicating the occupancy of the sites. Such indicator means, being in themselves well known, need not be described herein. For the purpose of illustrating one possible circuit arrangement for operating the various solenoids in the desired sequence, and not by way of limitation, certain specific circuits are shown in Figs. 22 and 23.

These circuits are in part operated by dolly-operated switches 144 and 145, which function as sensing devices for the dollies. A typical switch 144 is shown in Fig. 22, and comprises a bracket pivotally supporting a lever 146 carrying a rotatable roller 147 at its upper end. A tension spring 148 maintains the roller in its elevated position. The lower end of the lever carries a pair of insulated, movable electrical contacts coacting with spring-mounted switch contact point diagrammatically indicated at 149 and 150. The spring normally maintains the circuit between the movable contact on the lever and the lower contact 149 closed; when the roller is depressed the upper contact on the lever comes into engagement with the upper contact 150. The contacts 149 and 150 are spring mounted so that the circuit through the upper contact 150 is closed before the circuit through the lower contact 149 is opened.

The switches 144 and 145 are mounted at the sides of the storage sites with their rollers 147 just beyond the outer edges of the beams 76 or 77, as indicated in dotted lines in Fig. 22. Switches 144 are mounted along the longitudinal beams 76 slightly to the west of the midpoints of the sites, so as to be in alignment with the transverse beams 44 on the dollies, and at levels to be actuated thereby. The switches 145 are mounted along the transverse beams 77 near the southern corners, so as to be in alignment with the longitudinal beams 43 of the dollies, and to be actuated thereby. Locations for these switches are shown in Figs. 9 and 10.

Referring now particularly to Fig. 22, wherein the outline of site A–4 and a part of site B–4 are indicated in dotted lines, the switch 144 is shown, for clarity, displaced from its mounting near the beam 76. The south side of site A–4 has retractable guide rollers 86a. For energizing the solenoids of these rollers there is provided an electrical circuit supplied with operating power at terminals 151 which may, for example, be 110 volts A. C. or D. C. There is provided a second circuit supplied with control power at terminals 152 which may, for example, be 24 volts A. C. or D. C. For simplicity in illustration one side of each circuit is shown to be completed through ground. An electrical relay 153 has one terminal of its solenoid grounded; the other terminal is connected by circuit 154 to an operating switch SW–A–4 which, as indicated, is one of a group of operating switches located at the control station, by which control current may be applied to any selected relay from the circuit 155 which is always energized. The relay is of the double pole, single throw, normally open type. The upper pair of contacts are connected to the circuit 154 through circuit 156 and to the lower contact 149 of the switch 144, through circuit 157, respectively, and the lower movable contact of this switch 144 is connected to the circuit 155. The solenoids of rollers 86a are connected in parallel through a circuit 158 to one of the lower contacts of the relay; the other lower contact is connected via circuits 159 and 160 to the operating power supply. Circuit 160 is further connected to the upper movable contact of switch 144 and circuit 158 is connected to the upper contact 150 of switch 144.

Assuming that the site B–4 is vacant and site A–4 occupied by a dolly, to transfer the dolly southward the operator momentarily depresses switch SW–A–4. This operates relay 153, which locks itself by its upper contacts through circuit 156—157—149, the lower movable contact of switch 144 and circuit 155. Simultaneously, operating current is applied to the solenoids of rollers 86a by the lower relay contacts via circuit 160—159—158. The rollers 86a are thereupon retracted and the dolly rolls southward by force of gravity, causing its transverse beam 44 to depress the roller 147 and operate the switch 144 soon after it begins its movement. During the first part of the operation of the switch the circuit from 160 to 158 is completed through upper contact 150. Thereafter the relay-locking circuit through lower contact 149 is opened, permitting the relay to return to normal open position. After the dolly has cleared the switch 144 the spring 148 returns the switch to its normal position, thereby breaking the circuit to the guide roller solenoids through upper contact 150, and permitting the guide rollers 86a to rise into operative position. As a consequence of this circuit these guide rollers are returned to operative condition already before the dolly has completed its movement into site B–4.

It will be understood that similar circuits, controlled by the other switches shown, will be provided for other sites. These circuits may be further interlocked to prevent operation when the site into which a dolly would be transferred thereby is already occupied, or to prevent actuation of a stop or roller guarding the entrance to an elevator site when the elevator is not positioned at the floor; such elaborations, however, are not a part of this invention and, being in themselves well known, need not be further described.

For east and west movements it is necessary to operate two sets of stops or guide rollers because guide rollers are provided at both the west and east ends of the sites. A suitable control circuit for this situation is illustrated in Fig. 23, wherein the dolly-actuated sensing switches 145a and 145b are also shown removed from their actual positions near beams 77 as indicated in dotted lines. The drawing shows two complete control units of the type which is used in row A, wherein travel is in both upgrade and downgrade directions. Only the unit for controlling movement between sites A–3 and A–4 will be described; the unit for controlling movement between sites A–4 and A–5 is of like construction and corresponding elements bear like reference numbers.

Referring to Fig. 23 in detail, reference numbers 151 and 152 again designate circuits for the operating and control currents, respectively, each having one side grounded. A group of switches in the lower left part of the drawing represents switches at the control station; those in the upper row actuate solenoids for eastward movement by gravity (thus, SW4–AE indicates a switch for moving eastward from site A–4) and those in the lower row actuate solenoids for westward movement by the power translating mechanism, but do not automatically close the power switch to the motor 139.

Each circuit unit has a pair of switches 145a and 145b of the type previously described with reference to Fig. 22, having their rollers mounted in close proximity to the beams 77 of the adjoining sites and in the interval between them. Each unit further has a guide roller-control relay 161 and a power mechanism control relay 162, with one side of each solenoid grounded as shown. These are three-pole, single throw, normally open relays. Each relay 161 is connected by a separate circuit 161a to one of the switches at the control station for controlling eastward movement, thus one of these solenoids is shown to be connected to switch SWA–3E and the other to switch SWA–4E. Through these switches control current can be applied selectively to any relay 161. The upper pair of contacts provide a locking circuit; one of these contacts is connected by a circuit 163 to the circuit 161a and the other is connected to the lower stationary contact of the switch 145b. The two lower pairs of contacts provide operating current to the solenoids of retractable guide rollers 86; thus, one member of each of these pairs is connected through a common circuit 165 to the circuit 166 which is always energized; the second contact of the intermediate pair is connected by a circuit 167 to the solenoids of the two guide rollers 86 of the downgrade site; and the second contact of the third pair is connected by circuits 168 and 98 to the solenoids of the two guide rollers 86 of the upgrade site. The other terminals of these solenoids are completed through ground.

The locking circuit for relay 161 is completed through the normally closed, lower movable contact 164 of switch 145b, which is connected by circuit 169 to a common circuit 170 which is always energized with control current. The normally open, upper movable contact 172 of switch 145b is connected via circuit 171 to operating power in common circuit 166, and the upper stationary contact of this switch is connected by circuit 173 to the circuit 167.

Considering next the switch 145a, its lower stationary contact is connected by a circuit 175 to one member of each of the two lower contacts of relay 162; its normally closed, lower movable contact 174 is connected via circuit 176 to the control power circuit 170; its normally open, upper movable contact 178 is connected via circuit 177 to operating power in common circuit 166; and its upper stationary contact is connected through circuit 179 to the circuit 98 of the upgrade guide rollers.

Each relay 162 is connected by a separate circuit 180 to one of the switches at the control station for controlling westward movement; one is shown connected to switch SWA–4W (for controlling movement westward from site A-4) and the other to switch SWA-5W (for controlling westward movement from site A-5). The second pair of relay contacts provides a locking circuit; one of these contacts is connected by a circuit 181 to circuit 180; the other is connected to the previously described circuit 175. One member of the upper pair of contacts is connected through circuit 131 to one terminal of the solenoid 126a which operates the actuating plunger for the driving dog on the translating rod. Each of these solenoids has its other terminal grounded. The second member of the upper contacts is connected by circuits 182 and 171 to operating power in the common circuit 166. One member of the lower pair of contacts is connected to the previously described circuit 175; the other member is connected by a circuit 183 to circuit 161a.

To operate the circuit, consider a loaded dolly at rest within site A-3, and assume that site A-4 is vacant. To move the dolly eastward push button SWA-3E is depressed momentarily. This operates the relay 161 in the unit between sites A-3 and A-4, which locks itself by itself by its upper contacts through the circuit comprising elements 164—169—170. Simultaneously, operating current is applied to the solenoids of all four guide rollers, those of site A-4 being energized through circuit 166—165—167—98 and those of site A-3 being energized through circuit 166—165—168—98. This retracts all rollers and the dolly is freed to move eastward by gravity. Soon after this movement is begun the roller of switch 145a is depressed by the east end of the dolly, thereby closing the upper contacts thereof and connecting the solenoids of the guide rollers of site A-3 to operating power through a circuit including 166—177—178—179—98 in parallel to the existing circuit through the relay. Somewhat later the dolly operates switch 145b; this first closes the upper contacts, establishing a circuit for operating power to the solenoids of the guide rollers of site A-4 via 166—171—172—173—98 in parallel to the existing circuit through the relay. Immediately after the upper contacts are closed the lower contacts are opened, thereby opening the locking circuit to relay 161 through lower switch contact 164, and permitting the relay to return to normal, open position. After the west end of the dolly clears switch 145a the spring thereof returns the switch to its normal position, thereby breaking the circuit through its upper contact 178 and circuit 179 to the solenoids of the guide rollers in site A-3; this permits these guide rollers to return to operative condition already before the dolly has completed its movement into site A-4 for stopping a succeeding dolly. This is important in the event that two dollies in adjacent sites are started on their eastward travel at or nearly at the same instant; such dollies would travel with a small interval between them, permitting the guide rollers at the east end of site A-3 to intercept the second of these dollies. Reverting to the movement of the dolly moving from site A-3 to site A-4, when the west end of this dolly clears the switch 145b the spring thereof returns the switch to its normal position, thereby breaking the circuit through its upper contact 172 and circuit 173 to the solenoids of the guide rollers of site A-4; this permits these guide rollers to return to operative condition immediately upon arrival of the dolly. If site A-5 is vacant, movement of the dolly into it can be effected by momentarily depressing push button switch SWA-4E, either prior to, simultaneously with, or subsequent to the above-described momentary operation of switch SWA-3E; however, when both sites A-3 and A-4 are initially occupied switch SWA-3E must not be closed before operating SWA-4E, and suitable interlocking circuits not shown but as well understood may be employed to prevent this.

The elements involved in the above-described operation are similarly used in control circuits for movement along other east-west rows of the storage floor, i. e., rows B, D, F, G and H. Since no upgrade travel takes place in these rows, only these circuit elements are required and those not required for the operations of the foregoing paragraph, i. e., the relay 162, the lower contact 174 of switch 145a and the lower row of push button switches, are omitted in these rows. Such omission of elements being obvious, no further wiring diagram for such control circuits is presented herein.

The operation of the circuit for effecting upgrade travel will next be described. Let it be assumed that the site A-5 is occupied by a dolly which it is desired to move into site A-4, that site A-4 is vacant and that the translating rod 138 is in its eastern position as shown in Fig. 9. Push button switch SWA-5W is depressed momentarily. This operates the relay 162 in the east unit, which locks itself by its intermediate contacts through circuit 181—175—174—176—169—170. It also energizes the relay 161 of the same unit through the lower contacts of relay 162 via circuit 183, thereby operating relay 161 and causing it to lock itself and to energize the solenoids of all four guide rollers 86 between sites A-4 and A-5 by the circuits previously described in the operation for eastward movement. The operation of relay 162 further energizes the solenoid 126a in site A-5 through its upper contacts via circuit 131—182—171 and common operating power circuit 166; this causes the actuating plunger at this site to engage the dog 119a-4 and raise it into operative position with its shoulder 124 prepared for engagement with the dolly at site A-5. The unit is now ready for westward movement, which is effected by operating the motor 139 through a separate control switch, not shown. If it is desired to move the dolly through two sites, i. e., from A-5 into A-3 push button switch SWA-4W is pushed simultantously with SWA-5W or soon after movement of the translating rod 138 is begun.

Soon after the upgrade movement of the translating rod 138 is begun the west end of the dolly engages the roller of switch 145b, thereby first closing upper contact 172 and establishing a circuit for operating power to the solenoids of the guide rollers of site A-4 via 166—171—172—173—98 in parallel to the existing circuit through the relay 161. Immediately after the upper contacts are closed the lower contact 164 is opened, thereby opening the locking circuit to the relay 161; this relay, however, remains closed for the time being because the relay remains energized via circuits 175 and 183. Continued movement of the dolly brings its west end into engagement with the roller of switch 145a, thereby first closing its upper contact 178 and, thereafter, opening its lower contact 174. This first establishes a circuit for operating power to the solenoids of the guide rollers of site A-3 via 166—177—178—179—98 in parallel to the existing circuit through the relay 161; the second opens the locking circuit of relays 161 and 162 through the circuit 175, and thereby permits both relays to return to normal, open positions. Return of relay 161 does not affect the flow of operating power to any solenoid of the guide rollers; however, return of relay 162 to open condition breaks the circuit through its upper contacts to the solenoid 126a, which now returns to its lower, inoperative condition. When the east end of the dolly clears switch 145b the spring thereof returns the switch to its normal position, thereby breaking the circuit through its upper contact from the common operating power circuit 166 through 171—172—173—98 to the solenoids of the guide rollers of site A-5; this permits these guide rollers to return to operative condition. Subsequently, when the east end of the dolly clears the roller of switch 145a the spring thereof returns the switch to its normal position, thereby breaking the circuit through its upper contact from the common operating power circuit 166 through 171—177—178—179—98 to the solenoids of the guide rollers of site A-4. This permits these guide rollers to return to operative condition immediately upon arrival of the dolly thereat, so that the dolly may be retained there if desired. Return of switch 145a to normal also closes the lower contact thereof; this, however, has no operational consequence because the circuit 175 is connected onto the now open contacts of relay 162.

If it is desired to move more than one dolly by the same stroke of the translating rod several buttons of the lower row are depressed simultaneously. Similarly, if the stroke of this rod is to be continued through a distance of two sites, two contiguous buttons must be pressed. However, it should be noted that when two dollies in contiguous sites are to be thus moved through two sites, it is necessary, with the circuit shown, to operate the push button for the site initially occupied by the upgrade dolly more than once. For example, assume that sites A–4 and A–5 are both occupied and that it is desired to move their dollies simultaneously to sites A–2 and A–3, respectively. Push buttons SWA–3W, SWA–4W and SWA–5W are initially depressed simultaneously (the first of these buttons has a control circuit, not shown, similar to that controlled by the other switches, but arranged to control the solenoids between sites A–2 and A–3). When the motor 139 is operated to move translating rod 138 westward both dollies are carried upgrade and the sequence of operations previously described takes place at each of the two western circuit units. This will result in dropping of the relay 162 between the sites A–3 and A–4 to open position before the east dolly enters site A–4, and movement beyond site A–4 would be prevented by the return of the guide rollers thereat to raised positions. To permit such continued movement the push button SWA–4W must be depressed for a second time some time during the interval after the dolly clears switch 145b but before it clears switch 145a. This switch may, of course, be kept depressed throughout the entire first half of the movement; as an alternative when operating contiguous dollies, the dollies may be advanced through a distance of only one site and the motor 139 temporarily stopped, following which the operator may press the appropriate button and resume operation of motor 139 to complete the second half of the movement.

The same type of circuit may be used for controlling the vertically movable stops 104, guide rollers 86 and 86a actuating plungers 125 in the eastern transverse row A–5 to H–5 which also contains powered translating rods. However, since in this row no guide rollers or stops are provided at the north sides of the sites, the circuit can be simplified by omitting circuit elements for actuating the guide rollers or stops at the downgrade side of the intervals between sites. Such omission of elements being obviously effected, there is no need to present a separate, simplified circuit diagram for this row of sites.

VII. Modified storage floor with conveyor rollers

As was previously indicated, numerous modifications in the elements of the storage system may be made without departing from scope of the invention, and it is possible to use fluid pressure operated pistons in lieu of solenoids, and/or to mount the conveyor rollers on the storage floor. A modification illustrating both of these variants is shown in Figs. 24–32, it being understood that either one only of these variants may optionally be utilized. The embodiment to be described presently utilizes conveyor rollers having bevelled supporting surfaces for supporting bevelled tracks on modified dollies, so as to provide a centering force, and to facilitate movement of the dollies onto or off of the rollers in a line of travel parallel to the vertical plane containing the roller axes. Bevelled supporting roller surfaces may be provided either by the use of frusto-conical rollers operating on horizontal or inclined axes, or by cylindrical rollers mounted on inclined journals. In addition to the centering action provided by the bevels, positive guide means are provided, and in view of the provision of such guide means the use of a bevelled track The storage floor is arranged with the same plan may be regarded as an optional although preferred construction.

as that previously described, and also has entry and exit elevators at sites C–2 and G–5, and the dollies are loaded at similar loading and unloading stations, and these parts differ from those heretofore described only in the arrangement of the roller conveyor courses. Similarly, powered translating rods are provided as previously described, differing from those previously described only in that the driving dogs are shaped to engage the modified dollies and in that their actuating plungers are fluid pressure operated. Only the conveyor courses and the driving dogs and their actuating plungers, together with the valves for controlling the admission of fluid to the jacks to the conveyor rollers will, therefore, be described.

The modified dollies 184 are seen in Fig. 24 to have the same general plan view as the dollies according to Fig. 1, and they are adapted to be similarly loaded and unloaded by being nested in grooves in a loading or unloading platform which, however, they do not have castor rollers, and their marginal frame is constructed to a special cross-section as indicated in Figs. 26, 27 and 32. Thus, the marginal frame 185 may be pressed from a single piece of metal to present a flat marginal upper flange extending inwardly to form a border; an integral outer vertical face 186 on each of its four sides; an inwardly inclined portion forming a bevelled track 187; and a vertical guide flange 188 depending from the bottom of the track. The walls 186, tracks 187 and flanges 188 extend continuously about the four sides of the dolly. A pair of longitudinal channel beams 189 and 189a, and a transverse channel beam 190 aligned with channel beam extensions 190a and 190b are welded to the frame, these parts presenting continuous lower surfaces at the level of the bottom of flange 188. Beams 190, 190a and 190b are at the midsection of the dolly. Transverse bars 191 and 192' at the front and rear, welded to beams 189 or 189a and to the marginal frame, provide front and rear wheel-supporting platforms, there being similar platforms for the right and left wheels. These bars are spaced to provide slots through which wheel-supporting plungers may project, and they are disposed at elevations as shown in Fig. 26, whereby a supported vehicle wheel will be retained against lateral movement between the marginal frame and the beam 189 or 189a. The foremost bar 191a extends to above the level of the frame 185 to assist in locating the front vehicle wheel on the dolly over the front concave platforms.

Referring to Fig. 24, the garage building has longitudinal beams 192 running east and west, and transverse beams 193 running north and south, all being supported on columns 194, the beams being coplanar on an inclined plane sloping downwardly from north to south and from west to east. These beams delimit the boundaries of the storage sites, the six north-east sites only being shown in this figure. Of these, sites B–4 and B–5 are shown to be occupied by dollies 184 from which the vehicles were omitted for clarity. A transverse beam 195 extends north and south across each site at the midsection thereof.

The conveyor roller courses comprise rollers mounted for engaging the bevelled tracks 187, supplemented by rollers having upper supporting surfaces disposed parallel to the aforesaid inclined plane of the storage floor for supportingly engaging the beams 189, 189a and 190. The conveyor roller arrangements are not in every case identical in the different storage sites, but similar rollers are used wherever feasible. A typical roller arrangement will be described for site B–4 and in the vicinity thereof; the arrangements at other sites are similar, unless otherwise indicated.

Figure 29:
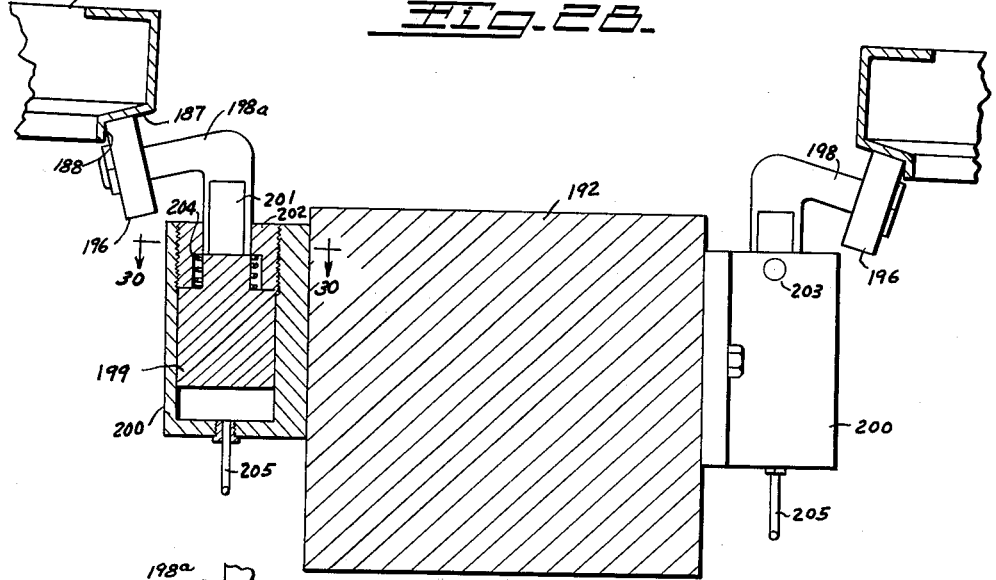
Figure 30:
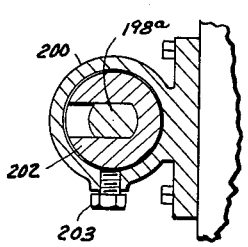
Fig. 30 is a section view taken on line 30—30 on Fig. 29.

Referring to Figs. 24, 29 and 30, a plurality of retractable conveyor rollers 196 and 197 are arranged in four rows forming a rectangle at the four sides of site B-4, eight such rollers, providing two for each side, being shown in the illustrative embodiment. Each roller is rotatable freely on an inclined journal formed integrally on the upward extension 198 or 198a of a piston 199 which is movable within a cylinder 200 secured to one of the beams 192 or 193. The cylinder and piston constitute a fluid operated jack for elevating or retracting the conveyor roller. The extension 198 has a pair of flattened portions 201 cooperating with the flat sides of a U-collar 202 to prevent rotation of the piston when the collar is secured by a set screw 203. The U-collar can be slid over the extension 198 and then screwed into the cylinder 200 to any desired extent for adjusting the height of the roller at its raised position. The top of the piston 199 engages a depending part of the collar to limit the upward movement of the piston, as shown, this movement being effected by fluid pressure. A compression spring 204 is interposed between the collar and piston and surrounds the piston extension to urge the piston downward. Operating fluid, such as air or a liquid, is admitted through conduit 205 to raise the piston against the action of the spring and to support a dolly resting on the roller; when fluid is withdrawn, as by venting fluid through conduit 205, the piston and roller are retracted, the roller 196 or 197 moving away from the dolly track to a level below the bottom of the flange 188. The conduits 205 of each pair of rollers at the same side of a site are interconnected as shown in Figs. 24 and 25.

The conveyor rollers 196 or 197 at opposite sides of the same site are arranged in rows which are spaced apart so that their nearer edges permit free passage of the flanges 188 of the dolly between them. The upper portions of the end faces of the rollers directed toward the center of the site, therefore, constitute guide means for insuring that the dolly moves along its proper course, and this guiding function is independent of their supporting function. Separate guide means, such as the rollers 211 to be described, bearing on the faces 186, may be used to perform this guiding function and the flanges 188 may in such case be omitted.

The conveyor rollers are mounted at elevations such that all rollers within a given row of rollers extending through several sites are on a common incline corresponding to that of the beams of the building. In the embodiment disclosed, wherein the four sides of the dollies have identical vertical cross-sections, all inclined conveyor rollers on the storage floor are coplanar on a plane inclined downwardly from north to south and from west to east, this relation having reference to the raised positions of the retractable rollers. The retractable rollers are also coplanar among themselves on a lower, parallel plane when in their retracted position; however, since movement of the dollies along their conveyor courses takes place only when the rollers are in their raised positions, no precise adjustment of the lower positions of the rollers is required, and no adjustment for the lower positions of the pistons 199 is provided. It should be further noted that the inclinations of the roller supporting surfaces must conform to the bevel of the tracks; in the illustrated embodiment, wherein all four dolly tracks have identical bevels and cylindrical rollers are used, it is necessary that all roller journal axes be inclined at the same angle to the common inclined plane of the floor. Hence, when the cylinders 200 and pistons 199 are mounted with vertical axes as shown, it is necessary to use differently shaped piston extensions on opposite sides of the sites. Thus, in Fig. 29, the journal 198a on the north side of the beam 192 (serving the south side of the site A-4) is inclined less from the horizontal than the journal 198 for the roller on the south side of the beam. A similar relation obtains between the roller journals mounted at the east and west sides of the sites.

Locations of vertically reciprocable conveyor rollers are indicated in Fig. 24, wherein, for convenience, the rollers along the beams 192 are designated by numbers 196 and those mounted along the beams 193 are designated 197.

When all eight conveyor rollers at any site are in their normal, raised positions the dolly is supported by all eight rollers and is prevented from rolling downgrade by the flanges 188 on the two downgrade sides which engage the rollers. To move the dolly from site B-4 southward the rollers 196 at the south side of site B-4 are retracted by venting fluid from their jack cylinders 200. It is not necessary to retract the rollers at the north side of site B-4 because of the bevelled construction of the tracks. The dolly thereupon rolls on the conveyor rollers 197 by force of gravity, being additionally supported by other rollers to be described, until the track 187 at the south side of the dolly moves over two bevelled stops 215 (to be described) at the south side of site C-4. The motion of the dolly is partly checked by riding up on these stops and is completely stopped by engagement of the flange 188 with these stops. The previously retracted rollers are then again raised to their normal positions by admitting fluid to the jack cylinders.

If, on the other hand, transfer of the dolly in an easterly direction is desired (and assuming site B-5 to be unoccupied), the four rollers 197 on the two sides of the beam 193 between sites B-4 and B-5 are lowered, permitting the dolly to roll by force of gravity on the rollers 196 and on other conveyor rollers to be described. Motion is in this case checked by riding of the east track 187 of the dolly up for a slight distance onto the fixed, inclined conveyor rollers 206 (to be described) at the east end of site B-5; motion is stopped by engagement of the flange 188 with the ends of these rollers.

It should be noted that elevation and depression of the rollers in this system does not raise or lower the dollies and that the dollies always remain at the elevation determined by the rollers at their uppermost positions. While this is the preferred mode of operation, the scope of the invention is not strictly limited thereto, and it is possible to retract all eight rollers for storing a dolly within a site. The appropriate conveyor rollers must in this case be elevated for discharging a dolly from the site.

The rollers at the outer sides of the storage floor and at the east and west ends of sites in rows C and E (i. e., wherever dollies do not cross, as indicated by the absence of arrows in Fig. 6) and need not be retractable and do not require jacks. At such sites stationary rollers 206 are used.

A typical stationary roller 206 is shown in Fig. 31, mounted on an inclined journal 207 to conform the upper supporting surface of the roller to the bevel of the dolly track 187. The journal 207 is mounted in a bifurcated support block 208 carried by an angle bracket 209 which is bolted to the beam 192 or 193. Typical locations for the fixed supports are shown in Fig. 24. It will be noted that two of these fixed rollers are mounted at each side of the above-specified sites at the sides along which a dolly travels. They replace rollers 196 or 197 at such sides and are located in corresponding positions.

To facilitate passage of the dollies across the beams 192 between sites along a north-south line of travel stationary rollers 206a are mounted at each end of row of rollers 197 or 206 along the beams 193 and in alignment therewith for engaging the dolly tracks 187. (See Figs. 24 and 25.) These rollers 206a, as shown in Fig. 25, are identical in construction with rollers 206 and are similarly supported but are mounted beyond the position occupied by the dolly when the latter is centered with a site. Because these rollers are clear of the sides of the dolly when centered, the rollers do not interfere with the east-west movement of the dolly and need not be retractable.

To facilitate passage of the dollies across the beams 193 between sites along an east-west line of travel stationary conveyor rollers 210 (see Figs. 24 and 26) are mounted in the beams 193 in recesses in the beams for rotation about journals parallel to said beams. These rollers are located in alignment with the dolly beams 189 and 189a and at elevations to afford vertical support thereto. To guide the dolly guide rollers 211 are mounted on the north and south sides of the columns 194 on almost vertical journals, i. e., on journals perpendicular to the plane of the floor, at locations to engage the vertical faces 186 of the dollies. (See Figs. 24 and 25.) These conveyor and guide rollers are, of course, not provided for sites in rows C and E.

Figure 28:
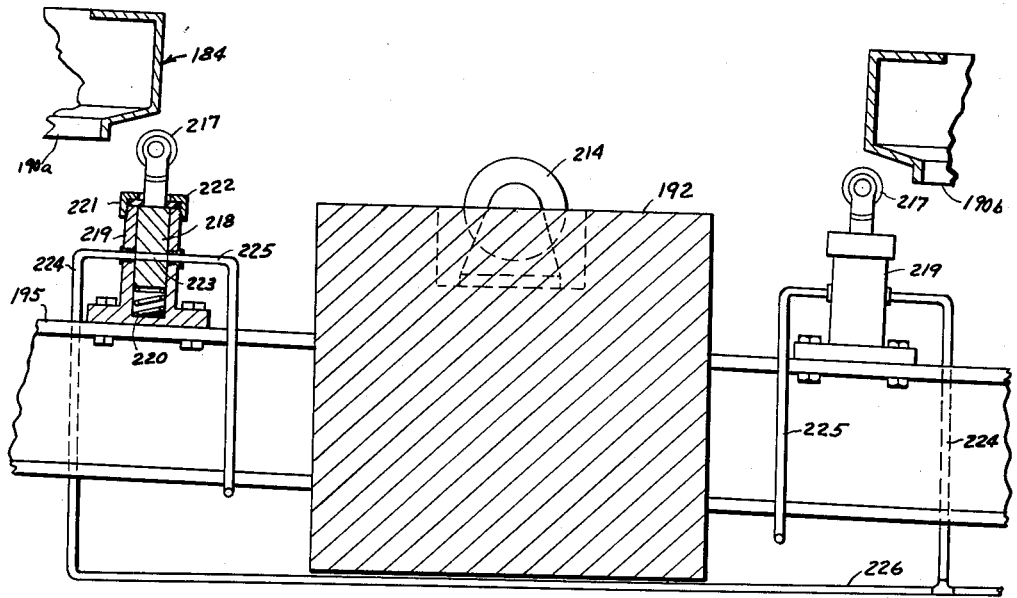
Figs. 28 and 29 are still further enlarged sectional views taken on correspondingly numbered section lines on Fig. 24, showing the details of the sensing units and of the vertically movable inclined conveyor rollers, respectively.

To permit light weight dollies to be used, additional rollers for affording vertical support are optionally provided as follows: Each transverse beam 195 carries a pair of auxiliary rollers 212 rotatable about journals parallel to the common plane and mounted in caster frames 213 pivoted about upright axes perpendicular to said common plane. (See Figs. 24 and 26.) These rollers engagingly support the longitudinal beams 189 and 189a of the dollies during movement along an east-west line of travel, and similarly support the transverse beam 190 and its extensions 190a and 190b during movement along a north-south line of travel, the castor mounting swinging on its axis to align the roller journal transversely to the line of travel. Further, each beam 192 has, at the midpoint thereof, a roller 214 mounted in a recess in the beam for rotation about a journal extending parallel to beam 192, as shown in Fig. 28. Rollers 214 supportingly engage the beam 190 and its extensions during passage of the dolly between sites along a north-south line.

It is not necessary to provide rollers on all four sides of sites through which dollies pass in only one line of travel and rollers with axes in planes parallel to said single line of travel may be omitted. Thus, not only may the rollers adjacent to the beams 193 of sites in rows C and E be stationary rollers 206, but the rollers along the beams 192 in these sites may be omitted entirely and replaced at the south side only by vertically movable, bevelled stops, indicated at 215. These stops are mounted on vertically reciprocable pistons movable in cylinders constructed as shown in Fig. 29. The construction of the supporting and operating elements for these stops being in all respects the same, and an elevation view of the stop being identical with the representation of the roller in Fig. 29, no separate drawing of the stop is included. The stop differs from the roller shown only in that the part indicated by number 196 in Fig. 29 is not rotatable about the piston extension 198a.

It will be understood that all of the non-retractable conveyor and guide rollers described above are mounted at elevations to engage the dolly parts specified when the dollies are on the raised inclined plane determined by the raised positions of the retractable rollers 196 and 197.

To control the admission and discharge of operating fluid to and from the cylinders 200 of the conveyor rollers and stops and to prevent inadvertent elevation thereof while a dolly is in transit between sites, a sensing unit is provided at each side of a site having retractable elements. A pair of sensing units operating in adjoining sites is illustrated in Fig. 24 between sites A-4 and A-5; a detail view of the units between sites A-4 and B-4 is shown in Fig. 28, while Fig. 25 further shows a similar unit at the north side of site D-5. Each sensing unit comprises a vertically movable sensing roller 216 or 217, the former being located to sense movement along an east-west line by engagement with the longitudinal dolly beam 189, and the latter for sensing movement along a north-south line by engagement with the transverse dolly beam 190 and its extensions. These units being of identical construction and differing only in the orientations of their sensing rollers and in their manner of support from the building, only the latter unit will be described in detail.

The sensing roller 217 is journalled at the top of a vertically movable plunger 218 which is reciprocable within a cylindrical housing 219. Housings associated with sensing rollers 217 are bolted to the beams 195, while those associated rollers 216 are bolted to the beams 193. Plunger 218 is urged upwardly by a spring 220 to the extent permitted by a cover plate 221 which is retained by a threaded cap 222. The plate 221 and the part of the plunger protruding therethrough are non-circular, whereby the plunger is retained against rotation within the cylinder housing. A transverse passage 223 in the plunger is in alignment with a pair of diametrically opposite ports in the housing to which conduits 224 and 225 are fitted. The passage 223 is in alignment with these ports only when the plunger is in its normal, raised position. When the roller and plunger are depressed from the illustrated position the passage 223 moves out of registry with the ports and the conduits 224 and 225 are isolated. Both conduits 224 from the two sensing units on opposite sides of the same beam of the building are connected to the same control conduit 226 which extends to a control station (not shown) at which pressure fluid may be admitted or vented. Each pair of sites has a separate control conduit 226. The conduit 225 from each housing is connected to the conduits 205 of both cylinders 200 at the same side of the site, as shown in Figs. 24 and 25.

When the plungers 218 of a pair of adjoining sensing units are both in their normal, raised positions all four rollers 196 or 197 at the adjoining site sides can be retracted or elevated simultaneously by means of control conduit 226. When it is desired to move a dolly between these sites the conduit 226 is vented from the control station, permitting the springs 204 to depress the four pistons at the sides between the sites, thereby retracting the conveyor rollers 196 or 197 or stops 215, as the case may be. This frees the dolly for movement, either downgrade by gravity, as previously described, or upgrade by the powered translating mechanism to be described. When the dolly moves its beams 189 or 190 depresses the sensing rollers in succession. Pressure may then be reapplied to the conduit 226 without thereby causing the elevation of the conveyor rollers or stops because the plungers 218 isolate the jack cylinders from the control conduit. When the dolly has cleared the sensing roller in the site from which it moved the plunger 218 thereof rises, re-establishing communication through its passage 223 and admitting pressure fluid to the jack cylinders in that site. The conveyor rollers or stops in that site are, therefore, again in operative position for intercepting another dolly which may be following the dolly which has just passed even before the dolly has completed its movement. When the moving dolly subsequently clears the sensing roller in its terminal site a similar sequence of events takes place and the conveyor rollers in the new site rise.

The foregoing description is applicable to all sensing units at sides of sites having retractable conveyor rollers or stops on both sides of the beams 192 or 193 traversed by the dolly. When such a retractable element is provided on only one side of the beam, e. g., at the beams 192 along the north sides of sites in rows C and E, a sensing unit is provided only on the side of the beam where a retractable element is to be controlled. Thus, there is a sensing unit with a roller 217 at the south side of site B-4 but none at the north side of site C-4.

The floor is provided with translating rods for moving the dolly upgrade. These rods are provided at the locations previously described for the first embodiment and are similarly constructed, and designated by like reference numbers where they appear on Fig. 24. The translating mechanism differs in that the translating rods 112, 113 and 138 are supported on the beams 192 or 193 and in that the hinged supports 132 are omitted, as is seen in Fig. 27. Further, the driving dogs 119 are given slightly different locations so as to engage the flanges 188 of the dollies, and are actuated by actuating plungers 125c which function as the previously described plungers 125 but are fluid pressure operated.

Referring to Fig. 32, the plunger 125c is vertically reciprocable within a cylinder 227 having a control conduit 228 extending to a control station through which operating fluid may be admitted or vented. The cylinder is supported by a bracket 229 from the beam 192. A spring 230, retained by a screw cap 231, urges the plunger down when the operating fluid is vented through control conduit. Other reference numbers correspond to elements previously described for Fig. 14. When operating fluid is forced into the cylinder 227 the plunger 125c is raised to the position shown, thereby elevating the dog 119 on the translating rod 112 to bring the dog into position for engagement of its shoulder with the flange 188 of the dolly frame when the rod 112 is moved upgrade. The plungers 125c within elevators are preferably electrically operated, as described in the previous embodiment, to permit flexible cables to be used. This electrical operation is also preferred in the case of the retractable stops 215 mounted on the elevator.

The other details of the system and the method of operation are the same as for the first embodiment and need not be further described.

I claim as my invention:

1. A vehicle storage device comprising: a plurality of vehicle storage sites arranged in a grid having more than two longitudinal rows and more than two transverse rows of sites; one or more inclined conveyor courses in each site, each conveyor course being in alignment and communication with a conveyor course in an adjacent site and having means for guidingly supporting vehicles thereon for movement thereon between the said adjacent sites, at least some of said conveyor courses extending along said longitudinal rows and at least some others of said conveyor courses extending along said transverse rows, said conveyor courses being arranged to place each site in communication with each of the other sites and to permit progressive downgrade movement of vehicles through successive sites along inclined conveyor courses by force of gravity; and stop means for holding a vehicle against the force of gravity at each storage site.

2. In combination with the storage device according to claim 1, a propelling device for moving vehicles upgrade between adjacent sites.

3. A vehicle storage device comprising: a plurality of vehicle storage sites arranged in a grid having more than two longitudinal rows and more than two transverse rows of sites, one of said sites being an entrance site for the admission of vehicles to be stored and another, non-adjacent site in a different longitudinal row and in a different transverse row from said entrance site being an exit site for the discharge of vehicles; one or more conveyor courses in each site, each conveyor course being in alignment and communication with a conveyor course in an adjacent site and having means for guidingly supporting vehicles for movement thereon between the said adjacent sites, each site other than said entrance site and exit sites having one or more conveyor courses thereof in alignment and communication with conveyor courses in at least two adjacent sites, and at least some of said sites having conveyor courses extending longitudinally and transversely, respectively, in alignment and communication with conveyor courses in at least three adjacent sites so as to include each site within a grid having the entrance and exit sites at its diagonally opposite corners in at least one continuous path of communicating conveyors starting with the entrance site and ending with the exit site; and control means in each site for arresting the movement of a vehicle therein independently of vehicles in other sites, the control means at least in one of said sites having both longitudinal and transverse conveyor courses including means for selectively guiding a vehicle for movement along either the longitudinal or transverse course thereof.

4. A vehicle storage device comprising: a plurality of vehicle storage sites arranged in a grid having longitudinal and transverse rows of storage sites, one of said sites being an entrance site for the admission of vehicles to be stored and another, non-adjacent site in a different longitudinal row and a different transverse row from said entrance site being a discharge site for the discharge of vehicles; one or more inclined conveyor courses in each site, each conveyor course being in alignment and communication with a conveyor course in an adjacent site in the same row and inclined in the same direction, at least some of said conveyor courses extending along said longitudinal rows and at least some others of said conveyor courses extending along said transverse rows, each conveyor having means for guidingly supporting vehicles for movement thereon between said adjacent sites, each site other than said entrance site and exit site having one or more conveyor courses in alignment and communication with conveyor courses in at least two adjacent sites and at least some of said sites having conveyor courses in alignment and communication with conveyor courses in at least three adjacent sites, so as to include each site within a grid having the entrance and exit sites at its diagonally opposite corners in at least one continuous downgrade path of communicating conveyor courses starting with the entrance site and ending with the exit site for progressive downgrade movement of a vehicle along any of said paths by force of gravity; means for selectively retaining vehicles at said storage sites or releasing them for downgrade movement to an adjacent site; and a propelling device for moving vehicles upgrade between at least some adjacent sites on said conveyor courses.

5. A vehicle storage device comprising: a plurality of vehicle storage sites arranged in a diagonally inclined grid arranged side by side in more than two longitudinal rows inclined downwardly in a common longitudinal direction and in more than two transverse rows inclined downwardly in a common transverse direction; a plurality of inclined conveyor courses extending through said sites along said rows having means for guidingly supporting vehicles for the transfer of vehicles downgrade by force of gravity between adjacent sites, some of said conveyor courses being aligned along said longitudinal rows and other courses being aligned along said transverse rows, and at least some of said sites having conveyor courses extending longitudinally and transversely, respectively, to provide a plurality of continuous downgrade paths along said conveyor courses from the site at the highest elevation through successive intermediate sites to the site at the lowest elevation; stop means at least at some of said sites higher than said site at the lowest elevation for selectively holding a vehicle thereat for storage or releasing it for downgrade movement along a selected conveyor course to an adjacent site; and a propelling device for moving vehicles upgrade along at least one of said rows.

6. A storage device according to claim 5 wherein said propelling device is located for moving vehicles upgrade along a row including said site at the lowest elevation, having an additional propelling device for moving vehicles upgrade along a row which includes said site of highest elevation and intersects the row having the first-named propelling device.

7. A storage device according to claim 5 wherein the propelling device comprises a translating member movable along said row; a plurality of driving members spaced along said translating member in different sites of said row having operative positions for driving said vehicles upgrade upon upgrade movement of the translating member and inoperative positions; and means for selectively moving said driving members to their operative and inoperative positions independently of each other, whereby any selected one or more vehicles in said row can be moved upgrade simultaneously.

8. A storage device for storing objects mounted on individual dollies adapted for support and movement on conveyor courses comprising: a plurality of dolly storage sites arranged in a grid having longitudinal and transverse rows; a plurality of inclined conveyor courses extending through said sites, said conveyor courses having means for guidingly supporting said dollies for downgrade movement thereon between adjacent sites by force of gravity, some of said conveyor courses extending along said longitudinal rows and other conveyor courses extending along said transverse rows, said conveyor courses being arranged to place each site in communication with the others to permit progressive downgrade movement of dollies through successive sites; and stop means for selectively holding a dolly at successive sites against the force of gravity for storage thereat or releasing the dolly thereat for downgrade movement.

9. In combination with the storage device according to claim 8, a propelling device in at least one of said rows having driving members for engaging dollies for moving said dollies upgrade between adjacent sites.

10. A storage device for storing objects mounted on individual dollies, each dolly having a plurality of swivelled castors and smooth, continuous guide faces extending longitudinally and transversely with respect to the dolly; a plurality of dolly storage sites arranged in a grid having longitudinal and transverse rows of sites; a plurality of roller conveyor courses extending through said sites along said longitudinal and transverse rows, said conveyor courses providing co-planar track surfaces disposed to support said castors for movement of said dollies thereon between adjacent sites, at least some sites having track surfaces extending both longitudinally and transversely, so as to place all sites into communication with each other; guide rollers on said conveyor courses located for engagement with said guide faces on the dollies and for guiding said dollies along the respective conveyor courses, the guide rollers for the longitudinal course and the guide rollers for the transverse course in at least the sites which communicate directly with an adjacent transverse site and with an adjacent longitudinal site having operative and inoperative positions and being separately movable to said operative and inoperative positions to permit movement of the dolly longitudinally and transversely; and means for moving the dollies on said conveyor courses between sites.

11. A storage device for storing objects mounted on individual dollies, each dolly having a plurality of swivelled castors and guide means separate from said castors extending longitudinally and transversely with respect to the dolly; a plurality of dolly storage sites arranged in a grid having longitudinal and transverse rows of sites; a plurality of roller conveyor courses extending through said sites along longitudinal and transverse rows, said conveyor courses provided co-planar track surfaces disposed to support said castor and inclined both longitudinally and tranversely for movement of the dollies thereon between adjacent sites by force of gravity, at least some sites having track surfaces extending both longitudinally and transversely, so as to place all sites into communication with each other; guides for said conveyor courses cooperating with said guide means on the dolly for guiding said dollies along the respective conveyor courses, the longitudinal and transverse guides in at least the sites which communicate directly with an adjacent transverse site and with an adjacent longitudinal site having operative and inoperative positions and being individually movable to said operative and inoperative positions to permit selective movement of the dolly longitudinally or transversely; means for moving the dollies on said conveyor courses between adjacent sites; and movable stop means both on said longitudinal courses and transverse courses for selectively holding a dolly at each site for storage thereat or permitting downgrade movement to an adjacent site.

12. A storage device for storing objects mounted in individual dollies, each dolly having two pairs of supporting tracks extending longitudinally and transversely with respect to the dolly along the margins thereof comprising: a plurality of dolly storage sites of rectangular outlines adapted to contain individual dollies, said sites being arranged in a grid having a plurality of longitudinal rows and a plurality of transverse rows of sites, one of said sites being an entrance site for the admission of loaded dollies to be stored and a non-adjacent site being an exit site for the discharge of loaded dollies; one or more dolly-supporting roller conveyor courses for each of said sites, at least some of said sites having two conveyor courses extending along a longitudinal row and a transverse row, respectively, each conveyor course comprising a pair of rows of rollers spaced to conform to a pair of dolly tracks in alignment and communication with a conveyor course in an adjacent site for movement thereon of a dolly along a row passing through said adjacent sites, at least one row of rollers of each conveyor course of such site which has two conveyor courses being retractable downwardly to permit passage of the dolly over the retracted row of one conveyor course while supported by the two rows of the other conveyor course in the same site and each row of rollers having a normally raised position with all four rows of rollers in the same site in supporting engagement with the dolly tracks, each site other than said entrance site and exit site having one or more conveyor courses in alignment and communication with conveyor courses in at least two adjacent sites for the transfer of dollies between the said adjacent sites, at least some of said sites having conveyor courses in alignment and communication with conveyor courses in at least three adjacent sites so as to include each site in a continuous path of communicating conveyor courses which path includes the exit site; and means for selectively raising or retracting said retractable rows of rollers.

13. The storage device according to claim 12 wherein all longitudinal conveyor courses are inclined downwardly in a common longitudinal direction and all transverse conveyor courses are inclined downwardly in a common transverse direction and the movable rollers at least on the downgrade side of each site which has two conveyor courses is shaped to engage the dolly to form a stop for preventing downgrade movement of the dolly from said site across said side.

14. In a dolly storage and switching unit, the combination of: a supporting frame; a primary roller conveyor course on said frame for receiving a dolly along a given line of travel; a primary guide having an operative position restricting movement of the dolly to said line of travel, at least part of said guide being movable to an inoperative position permitting movement of the dolly toward a discharge side of the unit along a different line of travel; a secondary roller conveyor course on said frame for discharging said dolly along said different line of travel; a secondary guide restricting said dolly after entry into the unit to said different line of travel, whereby a dolly after entry into the unit is held for storage therein when both guides are in operative positions and is released for discharge along said different line of travel when the primary guide is in its inoperative position; and means for moving said primary guide selectively to its operative or inoperative position.

15. The storage and switching unit according to claim 14 wherein the primary and secondary conveyor courses comprise continuous coplanar tracks affording support to rollers on said dolly, and said guides comprise guide rollers disposed to engage continuous guide surfaces on said dolly, at least the guide rollers on the discharge side being movable between a dolly-engaging position and a position clear of said dolly.

16. The storage and switching unit according to claim 14 wherein the primary conveyor course comprises a plurality of conveyor rollers having dolly-supporting surfaces arranged in spaced rows parallel to said given line of travel, said rollers having guide faces directed toward the center of the interval between the said parallel rows for guidingly engaging the dolly and restricting it to said given line of travel, said guide faces forming the said primary guide and at least the parts of said rollers on the discharge side being vertically movable relatively to the secondary conveyor course for movement of the primary guide into said inoperative position.

17. In a dolly storage and switching unit, the combination of: a supporting frame; a primary roller conveyor course on said frame for receiving a dolly along a given line of travel from a feed side of the unit; a secondary roller conveyor course on said frame for discharging said dolly toward a discharge side of the unit along a different line of travel, at least the parts of said conveyor courses at said feed and discharge sides being relatively vertically movable so as to have three relative positions, respectively: (a) a normal position with both primary and secondary conveyor courses in supporting engagement with a dolly in the unit for holding the dolly therein for storage; (b) a receiving position with the part of the primary conveyor course at said feed side at a higher position relatively to the nearby part of the secondary conveyor course than in said normal position; and (c) a discharging position with the part of the primary conveyor course at said discharge side at a lower position relatively to the nearby part of the secondary conveyor course than in said normal position; and means for imparting relative vertical motion to said parts of the conveyor courses and securing them selectively in any of said three relative positions.

18. In a dolly storage and switching unit, the combination of: a supporting frame; a primary roller conveyor course on said frame for receiving a dolly from a feed side of the unit and discharging said dolly toward a first discharge side of the unit along a given line of travel; a primary guide having an operative position restricting movement of the dolly to said line of travel, at least a part of said guide being movable to an inoperative position permitting movement of the dolly toward a second discharge side of the unit along a different line of travel; a secondary roller conveyor course on said frame for discharging said dolly along said different line of travel; a secondary guide having an operative position restricting movement of the dolly toward said first discharge side, whereby a dolly on the switching unit is held thereon for storage when both guides are in operative positions and is released for discharge along said first line of travel when the secondary guide is in inoperative position and is released for discharge along said other line of travel when the primary guide is in inoperative position; and means for independently moving the primary and secondary guides selectively to their operative or inoperative positions.

19. In a dolly storage and switching unit, the combination of: a supporting frame; a downwardly inclined primary roller conveyor course on said frame for receiving a dolly from a first feed side of the unit and discharging said dolly toward a first discharge side of the unit along a given line of travel downgrade by force of gravity, said primary conveyor course comprising a vertically movable guide disposed for engaging said dolly and guiding it for movement parallel to said line of travel and preventing lateral movement of the dolly across said line of travel; a downwardly inclined secondary roller conveyor course on said frame intersecting said primary conveyor course and substantially coplanar therewith for receiving a dolly from a second feed side of the unit and discharging said dolly toward a second discharge side of the unit along a different line of travel downgrade by force of gravity, said secondary conveyor course comprising a vertically movable guide disposed for engaging said dolly and guiding it for movement parallel to said line of travel and preventing lateral movement of the dolly across said line of travel, whereby a dolly within the unit will be held therein for storage when both guides are in their operative positions in engagement with the dolly, and the dolly can be released for downgrade movement along either conveyor course by moving the guide of the other conveyor course to its inoperative position; and means for independently moving each of said guides selectively to the operative or inoperative position.

20. In a dolly conveying unit for dollies having parallel, laterally spaced, upwardly and outwardly bevelled supporting tracks at two sides, the combination of: a supporting frame providing a pair of sides parallel to the direction of movement of the dolly; a plurality of conveyor rollers at each of said sides, said rollers being mounted for rotation about axes perpendicular to the said direction with their supporting surfaces inclined to conform to said bevelled tracks, the several rollers on each side of the frame being in alignment along an incline to support the dolly and permit rolling movement thereof downgrade by force of gravity; and a movable stop at the lower end of the frame having an operative position in the path of the dolly for engaging the dolly to prevent downgrade movement thereof and an inoperative position away from said path to permit downgrade of the dolly.

21. In a dolly conveying unit for dollies having two pairs of parallel, spaced, upwardly and outwardly bevelled supporting tracks arranged as a rectangle, the combination of: a supporting frame; a plurality of conveyor rollers mounted on said frame along four rows forming a rectangle conforming to said tracks, each roller being rotatable about an axis perpendicular to its respective row with the supporting surface thereof inclined to conform to said bevelled tracks, at least two adjacent rows independently movable vertically with respect to the other three rows and having raised positions with all four rows of rollers in engagement with the tracks on the dolly and retracted positions permitting the dolly to pass over the retracted rollers; and jack means for raising and lowering said vertically movable rows of rollers.

22. In a dolly switching unit for dollies having two pairs of parallel supporting tracks arranged as a rectangle, the combination of a supporting frame; a plurality of conveyor rollers mounted on said frame along four sides of a rectangle conforming to said tracks, each roller being rotatable about an axis substantially perpendicular to its respective side of the rectangle, all of said rollers being vertically movable, the rollers in at least two opposite sides of said rectangle being vertically movable independently of the rollers in the other sides, said vertically movable rollers having raised positions with the rollers of all four sides in engagement with the tracks on the dolly and retracted positions permitting the dolly to pass over the retracted rollers; and jack means for raising and lowering said movable rollers.

23. In a dolly switching unit for dollies having two pairs of parallel supporting tracks arranged as a rectangle, the combination of a supporting frame; four groups of vertically movable conveyor rollers arranged as the four sides of a rectangle conforming to said tracks mounted for rotation about axes substantially perpendicular to their respective sides of the rectangle, the rollers of each group being vertically movable independently of the rollers of the other groups, said rollers having raised positions with the rollers within each group in alignment along an incline with each pair of groups on opposite sides of said rectangle having the same inclination for supporting the dolly and permitting downgrade movement thereof selectively on either of said pair of groups, said rollers having retracted positions permitting the dolly to pass over the retracted rollers; and jack means for raising and lowering said movable rollers.

24. In a storage device for storing objects mounted on dollies having a plurality of storage sites adapted to contain said dollies and arranged in a row having roller conveyor means for movement of dollies along said row between said sites, a propelling device for selectively moving dollies on said conveyor means between sites comprising: an elongated translating member mounted for movement along said row; power means for moving said translating member along said row; a plurality of driving members pivotally mounted on the translating member at points spaced along said row adjacent dollies in different sites for movement with the translating member, said driving members having inoperative positions disengaged from the dollies and operative positions for drivingly engaging the dollies during movement of the translating member and a reciprocable, individually operable control plunger at each site from which movement of a dolly is to begin engageable with the respective driving member for controlling the position thereof, whereby any selected one or more of the dollies in said row can be moved simultaneously.

25. In a storage device for storing objects mounted on dollies having a plurality of storage sites adapted to contain said dollies and arranged in a row having roller conveyor means for movement of dollies along said row between said sites, a propelling device for selectively moving dollies on said conveyor means between sites comprising: an elongated translating member mounted for movement along said row; power means for moving said translating member along said row; a plurality of dogs pivotally mounted on the translating member about substantially horizontal axes below the dollies spaced along said row adjacent to dollies in different sites for movement with the translating member, said dogs having normal inoperative positions beneath the dollies and raised operative positions for drivingly engaging the dollies during movement of the translating member so that the reaction of a dolly against a dog in raised position will retain the dog in operative position during movement of the translating member after initial engagement of the dog with a dolly; and means situated at stationary positions at each site from which movement of a dolly is to begin for selectively moving said dogs individually to their raised operative positions by engagement with said dogs only at the start of a driving movement of the translating member, whereby any selected one or more of the dollies in said row can be moved simultaneously.

References Cited in the file of this patent

UNITED STATES PATENTS

| | | |
|---|---|---|
| 444,227 | Tiffany | Jan. 6, 1891 |
| 800,165 | Morgan | Sept. 26, 1905 |
| 1,740,014 | Hawkins | Dec. 17, 1929 |
| 1,775,799 | Young | Sept. 16, 1930 |
| 1,783,363 | Grob | Dec. 2, 1930 |
| 1,869,046 | Buck | July 26, 1932 |
| 2,013,482 | Taylor | Sept. 3, 1935 |
| 2,216,637 | Auger | Oct. 1, 1940 |

FOREIGN PATENTS

| | | |
|---|---|---|
| 337,726 | Great Britain | Oct. 28, 1930 |
| 701,586 | France | Mar. 18, 1931 |